US011983881B2

(12) United States Patent
Wang et al.

(10) Patent No.: US 11,983,881 B2
(45) Date of Patent: May 14, 2024

(54) AI-BASED IMAGE REGION RECOGNITION METHOD AND APPARATUS AND AI-BASED MODEL TRAINING METHOD AND APPARATUS

(71) Applicant: Tencent Technology (Shenzhen) Company Limited, Shenzhen (CN)

(72) Inventors: Ruichen Wang, Shenzhen (CN); Xiaoli Wang, Shenzhen (CN); Guixia Yan, Shenzhen (CN); Chucheng Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 334 days.

(21) Appl. No.: 17/395,329

(22) Filed: Aug. 5, 2021

(65) Prior Publication Data
US 2021/0366123 A1    Nov. 25, 2021

Related U.S. Application Data

(63) Continuation of application No. PCT/CN2020/096237, filed on Jun. 16, 2020.

(30) Foreign Application Priority Data

Jun. 20, 2019  (CN) .......................... 201910537529.X

(51) Int. Cl.
*G06T 7/11*        (2017.01)
*G06T 7/12*        (2017.01)
(Continued)

(52) U.S. Cl.
CPC .................. *G06T 7/11* (2017.01); *G06T 7/12* (2017.01); *G06T 7/149* (2017.01); *G06V 10/26* (2022.01);
(Continued)

(58) Field of Classification Search
CPC ... G06T 7/11; G06T 7/12; G06T 7/149; G06T 2207/10024; G06T 2207/20081;
(Continued)

(56) References Cited

U.S. PATENT DOCUMENTS 10,445,557 B2 * 10/2019 Pauly ...................... G06T 7/162
2008/0240564 A1  10/2008 Sun et al.
(Continued)

FOREIGN PATENT DOCUMENTS

CN        102982529 A      3/2013
CN        107657619 A      2/2018
(Continued)

OTHER PUBLICATIONS

Tencent Technology, ISR, PCT/CN2020/096237, Sep. 18, 2020, 3 pgs.
(Continued)

*Primary Examiner* — Mekonen T Bekele
(74) *Attorney, Agent, or Firm* — Morgan, Lewis & Bockius LLP

(57) ABSTRACT

A computer device obtains a to-be-segmented image that includes a plurality of extreme points corresponding to a target object in the to-be-segmented image. The device generates first image feature information according to the to-be-segmented image. The first image feature information includes N image matrices and a first heatmap that is generated according to the extreme points. The device obtains a first image segmentation region corresponding to the first image feature information using a first image segmentation model. The device also obtains a second heatmap according to an annotation point corresponding to the first image segmentation region and the first image segmentation region. The device obtains a second image segmentation region corresponding to the to-be-segmented (Continued)

image using a second image segmentation model. The device generates an image recognition result according to the second image segmentation region.

20 Claims, 11 Drawing Sheets

(51) Int. Cl.
```
G06T 7/149      (2017.01)
G06V 10/26      (2022.01)
G06V 10/44      (2022.01)
G06V 10/46      (2022.01)
G06V 10/774     (2022.01)
G06V 10/82      (2022.01)
G06V 20/20      (2022.01)
```
(52) U.S. Cl.
CPC .......... *G06V 10/454* (2022.01); *G06V 10/469* (2022.01); *G06V 10/774* (2022.01); *G06V 10/82* (2022.01); *G06V 20/20* (2022.01)

(58) Field of Classification Search
CPC . G06T 2207/20084; G06T 2207/20101; G06T 7/187; G06T 2207/10004; G06V 10/26; G06V 10/454; G06V 10/469; G06V 10/774; G06V 10/82; G06V 20/20
See application file for complete search history.

(56) References Cited

U.S. PATENT DOCUMENTS

| | | | |
|---|---|---|---|
| 2016/0098589 A1 | 4/2016 | Brieu | |
| 2017/0124415 A1 | 5/2017 | Choi et al. | |
| 2018/0053033 A1 | 2/2018 | Brieu | |
| 2019/0059770 A1* | 2/2019 | Gunasekar | G16H 30/20 |

FOREIGN PATENT DOCUMENTS

| | | |
|---|---|---|
| CN | 110210487 A | 9/2019 |
| CN | 110232696 A | 9/2019 |
| CN | 110276344 A | 9/2019 |

OTHER PUBLICATIONS

Extended European Search Report, EP20827039.7, dated Jul. 15, 2022, 10 pgs.
Rodrigo Benenson et al., "Large-Scale Interactive Object Segmentation with Human Annotators", 2019 IEEE/CVF Conference on Computer Vision and Pattern Recognition (CVPR), IEEE, Jun. 15, 2019, XP033686781, 10 pgs.
K.-K. Maninis et al., "Deep Extreme Cut: From Extreme Points to Object Segmentation", 2018 IEEE/CVF Conference on Computer Vision and Pattern Recognition, IEEE, Jun. 18, 2018, XP033476022, 10 pgs.
Liang-Chich Chen et al., "Encoder-Decoder with Atrous Separable Convolution for Semantic Image Segmentation", Oct. 6, 2018, SAT 2015 18$^{th}$ International Conference, Austin, TX, USA, XP047488272, 19 pgs.
Hoel Kervadec et al., "Boundary Loss for Highly Unbalanced Segmentation", Proceedings of Machine Learning Research, Dec. 17, 2018, 10 pgs., Retrieved from the Internet: https://arxiv.org/pdf/1812 07032v1.pdf.
Tencent Technology, JP Office Action, Japanese Patent Application No. 2021-537734, dated Aug. 23, 2022, 15 pgs.
Zian Wang et al., "Object Instance Annotation with Deep Extreme Level Set Evolution", 2019 IEEE/CVF Conference on Computer Vision and Patterns Recognition (CVPR), IEEE, Jun. 15, 2019, 10 pgs., Retrieved from the Internet: https://iecexplore.ieee.org/document/8954408.
Tencent Technology, WO, PCT/CN2020/096237, Sep. 18, 2020, 5 pgs.
Tencent Technology, IPRP, PCT/CN2020/096237, Dec. 21, 2021, 6 pgs.
Eirikur Agustsson et al., "Interactive Full Image Segmentation by Considering All Regions Jointly", 2019 IEEE/CVF Conference on Computer Vision and Pattern Recognition, DOI: 10.1109/CVPR.2019.01189, Jun. 15, 2019, 10 pgs.
Liang-Chieh Chen et al., "DeepLab: Semantic Image Segmentation with Deep Convolutional Nets, Atrous Convolution, and Fully Connected CRFs", IEEE Transactions on Pattern Analysis and Machine Intelligence, vol. 40, No. 4, DOI: 10.1109/TPAMI.2017.2699184, Apr. 1, 2018, 15 pgs.
Liang-Chieh Chen et al., "Rethinking Atrous Convolution for Semantic Image Segmentation", Retrieved from the Internet: https://arxiv.org/pdf/1706.05587v1.pdf, Jun. 17, 2017, 10 pgs.
Tencent Technology, European Office Action, EP Patent Application No. 20827039.7, dated Dec. 4, 2023, 8 pgs.

* cited by examiner (a) Depthwise convolution   (b) Pointwise convolution   (c) Atrous depthwise convolution

AI-BASED IMAGE REGION RECOGNITION METHOD AND APPARATUS AND AI-BASED MODEL TRAINING METHOD AND APPARATUS

CROSS-REFERENCE TO RELATED APPLICATIONS

This application is a continuation application of PCT Patent Application No. PCT/CN2020/096237, entitled "ARTIFICIAL INTELLIGENCE-BASED IMAGE REGION RECOGNITION METHOD AND APPARATUS, AND MODEL TRAINING METHOD AND APPARATUS" filed on Jun. 16, 2020, which claims priority to Chinese Patent Application No. 201910537529.X, filed with the State Intellectual Property Office of the People's Republic of China on Jun. 20, 2019, and entitled "IMAGE REGION SEGMENTATION METHOD AND APPARATUS AND MODEL TRAINING METHOD AND APPARATUS", all of which are incorporated herein by reference in their entirety.

FIELD OF THE TECHNOLOGY

This application relates to the field of artificial intelligence (AI), and in particular, to image region segmentation and recognition.

BACKGROUND OF THE DISCLOSURE

With the development of computer technologies, the image segmentation technology is increasingly widely applied, for example, medical image segmentation, and natural image segmentation. The image segmentation technology is a technology of segmenting an image into several particular regions having special properties, and specifying a target of interest. For example, in a human tissue image segmentation scenario, a medical image may be segmented, so that various human tissues can be clearly distinguished in the segmented image.

Currently, a tool for auxiliary segmentation is provided. First, a user draws a bounding box (bbox) in the image, and a to-be-annotated target is selected by using the bbox, and then a polygon segmentation result of the to-be-annotated target is outputted through a neural network model. If the segmentation result is not accurate, the user may correct the result.

SUMMARY

Embodiments of this application provide an AI-based image region recognition method and apparatus and an AI-based model training method and apparatus. A region with a relatively poor segmentation effect in image segmentation at the first stage is further segmented by using auxiliary segmentation at the second stage, to obtain a more accurate image segmentation result, thereby improving image segmentation performance.

In view of this, according to a first aspect of this application, an image region recognition method is provided, performed by an image processing device, the method including:
  obtaining a to-be-segmented image, the to-be-segmented image including a plurality of extreme points corresponding to a target object in the to-be-segmented image;
  generating first image feature information according to the to-be-segmented image, the first image feature information including N image matrices and a first heatmap, the first heatmap is generated according to the plurality of extreme points and N is an integer greater than or equal to 1;
  obtaining a first image segmentation region corresponding to the first image feature information by using a first image segmentation model, the first image segmentation model including a first heatmap channel and N first matrix channels, the N first matrix channels having a one-to-one correspondence with the N image matrices, the first heatmap channel corresponding to the first heatmap;
  obtaining a second heatmap according to an annotation point corresponding to the first image segmentation region and the first image segmentation region; and
  obtaining a second image segmentation region corresponding to the to-be-segmented image by using a second image segmentation model, the second image segmentation model including a segmentation region channel, a second heatmap channel, and N second matrix channels, the N second matrix channels having a one-to-one correspondence with the N image matrices, the segmentation region channel corresponding to the first image segmentation region, the second heatmap channel corresponding to the second heatmap.

According to another aspect of this application, a model training method is provided, performed by an image processing device, the method including:
  obtaining a to-be-trained image set, the to-be-trained image set including at least one to-be-trained image;
  obtaining a first predicted segmentation region of the to-be-trained image by using a first image segmentation model, the first image segmentation model being a pre-trained image segmentation model;
  generating a to-be-trained heatmap according to a real segmentation region of the to-be-trained image and the first predicted segmentation region, the to-be-trained heatmap being generated by using at least one difference point;
  obtaining a second predicted segmentation region according to the to-be-trained image, the first predicted segmentation region, the to-be-trained heatmap, and the real segmentation region by using a to-be-trained image segmentation model;
  determining a model parameter corresponding to the to-be-trained image segmentation model by using a target loss function and according to the second predicted segmentation region and the real segmentation region; and
  training the to-be-trained image segmentation model by using the model parameter to obtain a second image segmentation model.

According to another aspect of this application, an image processing device is provided, including
  an obtaining module, configured to obtain a to-be-segmented image, the to-be-segmented image including a plurality of extreme points; and
  a generation module, configured to generate first image feature information according to the to-be-segmented image obtained by the obtaining module, the first image feature information including N image matrices and a first heatmap, the first heatmap being generated according to the plurality of extreme points, N being an integer greater than or equal to 1;

the obtaining module being configured to obtain, by using a first image segmentation model, a first image segmentation region corresponding to the first image feature information generated by the generation module, the first image segmentation model including a first heatmap channel and N first matrix channels, the N first matrix channels being in one-to-one correspondence with the N image matrices, the first heatmap channel being corresponding to the first heatmap;

the obtaining module being further configured to obtain a second heatmap according to an annotation point corresponding to the first image segmentation region and the first image segmentation region;

the obtaining module being further configured to obtain a second image segmentation region corresponding to the to-be-segmented image by using a second image segmentation model, the second image segmentation model including a segmentation region channel, a second heatmap channel, and N second matrix channels, the N second matrix channels being in one-to-one correspondence with the N image matrices, the segmentation region channel being corresponding to the first image segmentation region, the second heatmap channel being corresponding to the second heatmap; and the generation module being configured to generate an image recognition result of the to-be-segmented image according to the second image segmentation region.

According to another aspect of this application, an image processing device (e.g., a computer device, a computer system, an electronic device, etc.) is provided, including an obtaining module, configured to obtain a to-be-trained image set, the to-be-trained image set including at least one to-be-trained image, the obtaining module being further configured to obtain a first predicted segmentation region of the to-be-trained image by using a first image segmentation model, the first image segmentation model being a pre-trained image segmentation model;

a generation module, configured to generate a to-be-trained heatmap according to a real segmentation region of the to-be-trained image and the first predicted segmentation region obtained by the obtaining module, the to-be-trained heatmap being generated by using at least one difference point, the obtaining module being further configured to obtain a second predicted segmentation region according to the to-be-trained image, the first predicted segmentation region, the to-be-trained heatmap generated by the generation module, and the real segmentation region by using a to-be-trained image segmentation model;

a determining module, configured to determine a model parameter corresponding to the to-be-trained image segmentation model according to the second predicted segmentation region obtained by the obtaining module and the real segmentation region by using a target loss function; and a training module, configured to train the to-be-trained image segmentation model by using the model parameter determined by the determining module to obtain a second image segmentation model.

According to another aspect of this application, a terminal device (e.g., an electronic device, a computer device, etc.) is provided, including: a memory, a transceiver, a processor, and a bus system, the memory being configured to store a program;

the processor being configured to execute the program in the memory, including the following operations:

obtaining a to-be-segmented image, the to-be-segmented image including a plurality of extreme points;

generating first image feature information according to the to-be-segmented image, the first image feature information including N image matrices and a first heatmap, the first heatmap being generated according to the plurality of extreme points, N being an integer greater than or equal to 1;

obtaining a first image segmentation region corresponding to the first image feature information by using a first image segmentation model, the first image segmentation model including a first heatmap channel and N first matrix channels, the N first matrix channels being in one-to-one correspondence with the N image matrices, the first heatmap channel being corresponding to the first heatmap;

obtaining a second heatmap according to an annotation point corresponding to the first image segmentation region and the first image segmentation region;

obtaining a second image segmentation region corresponding to the to-be-segmented image by using a second image segmentation model, the second image segmentation model including a segmentation region channel, a second heatmap channel, and N second matrix channels, the N second matrix channels being in one-to-one correspondence with the N image matrices, the segmentation region channel being corresponding to the first image segmentation region, the second heatmap channel being corresponding to the second heatmap; and generating an image recognition result of the to-be-segmented image according to the second image segmentation region; and the bus system being configured to connect the memory and the processor, to cause the memory to communicate with the processor.

According to another aspect of this application, a computer server (e.g., computer system, computer device, etc.) is provided, including a memory, a transceiver, a processor, and a bus system, the memory being configured to store a program;

the processor being configured to execute the program in the memory, including the following operations:

obtaining a to-be-trained image set, the to-be-trained image set including at least one to-be-trained image;

obtaining a first predicted segmentation region of the to-be-trained image by using a first image segmentation model, the first image segmentation model being a pre-trained image segmentation model;

generating a to-be-trained heatmap according to a real segmentation region of the to-be-trained image and the first predicted segmentation region, the to-be-trained heatmap being generated by using at least one difference point;

obtaining a second predicted segmentation region according to the to-be-trained image, the first predicted segmentation region, the to-be-trained heatmap, and the real segmentation region by using a to-be-trained image segmentation model;

determining a model parameter corresponding to the to-be-trained image segmentation model according to the second predicted segmentation region and the real segmentation region by using a target loss function; and training the to-be-trained image segmentation model by using the model parameter to obtain a second image segmentation model; and the bus system being configured to connect the memory and the processor, to cause the memory to communicate with the processor.

According to another aspect of this application, a non-transitory computer-readable storage medium is provided, the computer-readable storage medium being configured to store a computer program, the computer program being configured to perform the methods according to the foregoing aspects.

According to another aspect of this application, a computer program product including instructions is provided, the instructions, when run on a computer, causing the computer to perform the methods according to the foregoing aspects.

As can be seen from the foregoing technical solution, the embodiments of this application have at least the following advantages:

According to an embodiment of this application, an image region recognition method is provided. A to-be-segmented image is first obtained, the to-be-segmented image including a plurality of extreme points (e.g., the plurality of extreme points correspond to a target object in the to-be-segmented image); then first image feature information is generated according to the to-be-segmented image; next, a first image segmentation region corresponding to the first image feature information is obtained by using a first image segmentation model; further, a second heatmap is obtained based on an annotation point corresponding to the first image segmentation region and the first image segmentation region; and finally a second image segmentation region corresponding to the to-be-segmented image is obtained by using a second image segmentation model. Through the foregoing manner, a process of image segmentation is divided into two stages. A region with a relatively poor segmentation effect in image segmentation at the first stage may be further segmented by using auxiliary segmentation at the second stage, so as to obtain a more accurate image segmentation result. There is no need to spend a lot of time on correcting the image segmentation result, thereby improving image segmentation performance. In addition, the image recognition result of the to-be-segmented image may be generated according to the second image segmentation region, thereby improving recognition accuracy.

DESCRIPTION OF EMBODIMENTS

Figure 1:
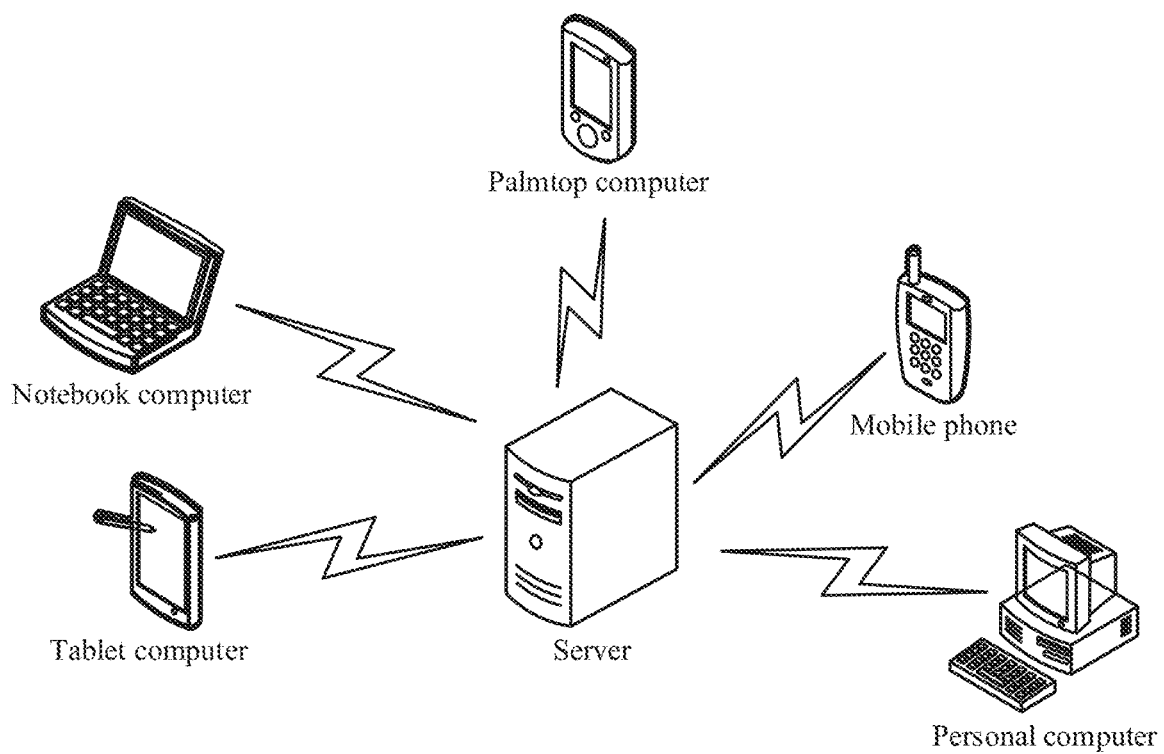
FIG. 1 is a schematic architectural diagram of an image region recognition system according to an embodiment of this application.

Embodiments of this application provide an image region recognition method and apparatus and a model training method and apparatus. A region with a relatively poor segmentation effect in image segmentation at the first stage is further segmented by using auxiliary segmentation at the second stage, so as to obtain a more accurate image segmentation result, thereby improving image segmentation performance.

The terms such as "first", "second", "third", and "fourth" (if any) in the specification and claims of this application and in the accompanying drawings are used for distinguishing similar objects and not necessarily used for describing any particular order or sequence. Data used in this way is interchangeable in a suitable case, so that the embodiments of this application described herein can be implemented in a sequence in addition to the sequence shown or described herein. In addition, the terms "include", "corresponding to" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

It is to be understood that, the image region segmentation method provided in this application may be applied to the field of AI, and specifically, to the field of computer vision. With the continuous development of the computer science technology, image processing and analysis has gradually formed a scientific system, and new processing methods are emerging all the time. In spite of the short development, image processing and analysis has received extensive attention from all aspects. First, vision is the most important means of human perception, and image is the basis of vision. Therefore, digital images have become an effective tool for scholars in many fields such as psychology, physiology, and computer science to study visual perception. Secondly, image processing is increasingly required in large-scale applications such as military, remote sensing, and meteorology. Image segmentation technology has always been the basic technology and important research direction in the field of computer vision, and specifically, it is to segment regions of interest (such as people, cars, buildings, and the like) from an image according to real contours. The image segmentation technology is an important part of image semantic understanding. In recent years, with the development of neural network, image processing capability is significantly increased, and the image segmentation technology plays a more important role in fields such as medical image analysis (including positioning of tumors and other pathologies, tissue volume measurement, computer guided surgery, customization of treatment regimens, research on anatomical structures), face recognition, fingerprint recognition, unmanned driving, and machine vision.

For ease of understanding, FIG. 1 is a schematic architectural diagram of an image region recognition system according to an embodiment of this application. As shown in FIG. 1, an image processing device provided in this application includes a terminal device or a server, for example, the image processing device may be a terminal device deployed with a client, and the client may be specifically an auxiliary segmentation tool. The terminal device deployed with the client includes, but is not limited to, a tablet computer, a notebook computer, a palmtop computer, a mobile phone, a speech interaction device, and a personal computer (PC), and is not limited herein.

To make it easier for users to annotate an image segmentation data set, an interactive image auxiliary segmentation tool based on neural network models (that is, a first image segmentation model and a second image segmentation model) is provided in this application. In an image segmentation annotation task, the auxiliary segmentation tool only needs to obtain a small quantity of user interaction behaviors to feed back a relatively accurate pre-segmentation result (that is, obtain a first image segmentation region) by using a neural network model (that is, the first image segmentation model), and then performs a small quantity of secondary annotations based on the pre-segmentation result (that is, the first image segmentation region) to obtain a final segmentation result (that is, a second image segmentation region) by using a neural network model (that is, the second image segmentation model). According to this application, a segmentation method based on "interaction of a small quantity of annotation points" is provided, and an image segmentation model is improved, thereby obtaining better segmentation results and tool real-time performance.

The first image segmentation model and the second image segmentation model may be deployed in a server used as an image processing device. Prediction of an image segmentation region is performed by using the first image segmentation model and the second image segmentation model, to segment an image online. In some embodiments, the first image segmentation model and the second image segmentation model may be alternatively deployed in a terminal device used as an image processing device. In an off-line state, an image is segmented off-line through prediction of an image segmentation region.

Figure 2:
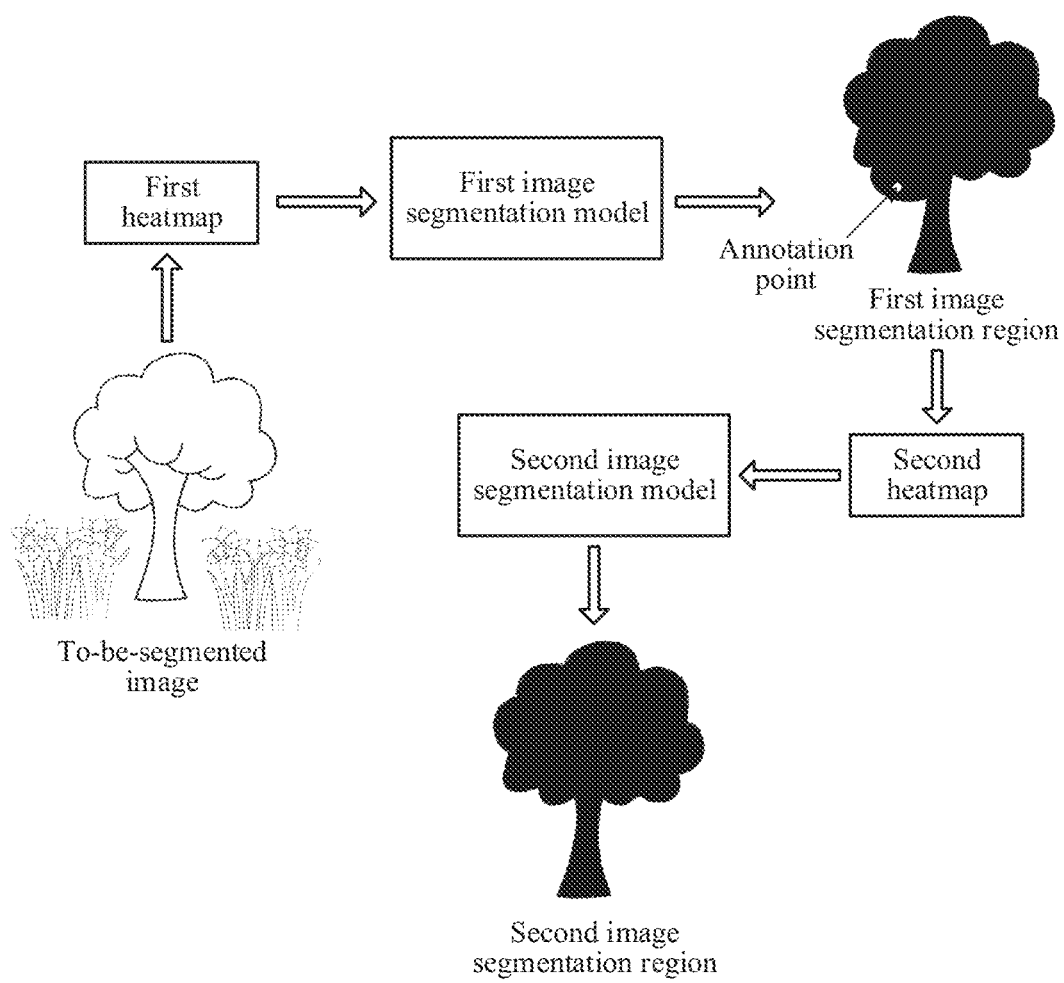
FIG. 2 is a schematic flowchart of an image region recognition method according to an embodiment of this application.

FIG. 2 is a schematic flowchart of an image region recognition method according to an embodiment of this application. As shown in FIG. 2, a user annotates an extreme point for a to-be-processed image by using an auxiliary segmentation tool. For example, the user annotates a tree in a to-be-segmented image in FIG. 2, and the auxiliary segmentation tool generates a first heatmap according to an annotation result of the user, and combines the first heatmap and an image matrix of the to-be-segmented image to obtain first image feature information. The first image feature information is inputted into a first image segmentation model, and feature extraction is performed on the first image feature information by using the first image segmentation model to output a first image segmentation region, for example, to obtain a segmentation region of the tree. The first image segmentation model may be an image segmentation convolutional neural network (CNN), and a model structure thereof mainly includes an input layer, a feature extraction layer, and an output layer. Because an effect of the generated first image segmentation region is not good enough, the auxiliary segmentation tool may be further adopted to input an annotation point, for example, generate a second heatmap according to the annotation point inputted by the user, and combine the second heatmap, the image matrix of the to-be-processed image, and the first image segmentation region to obtain second image feature information. The second image feature information is inputted into a second image segmentation model, and feature extraction is performed on the second image feature information by using the second image segmentation model to output a second image segmentation region, so as to obtain a more accurate segmentation region of the tree. Image recognition is performed on the to-be-segmented image according to the second image segmentation region, and the obtained image recognition result is relatively accurate.

Figure 3:
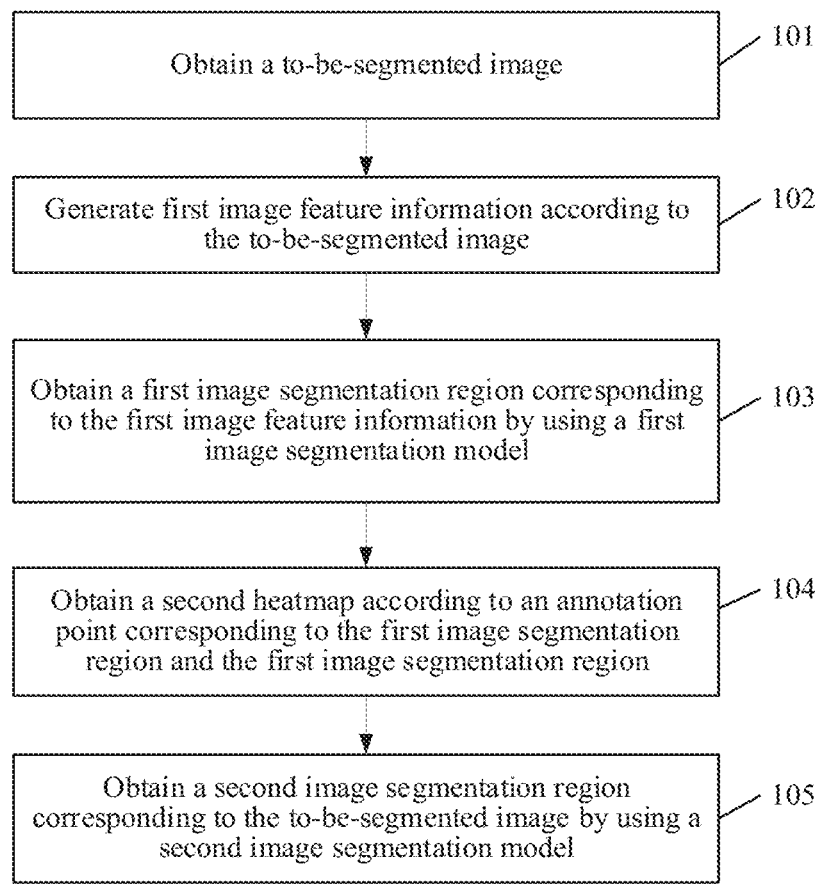
FIG. 3 is a schematic diagram of an embodiment of an image region recognition method according to an embodiment of this application.

The image region segmentation method in this application is introduced below with reference to the foregoing introduction. Referring to FIG. 3, an embodiment of the image region recognition method in the embodiment of this application includes the following steps:

101: Obtain a to-be-segmented image. The to-be-segmented image includes a plurality of extreme points.

In this embodiment, an image processing device obtains a to-be-segmented image (e.g., an image in which segmentation will be performed), and the image processing device may be embodied as an auxiliary segmentation tool deployed therein, and the to-be-segmented image may be obtained through annotation by using the auxiliary segmentation tool. The user uses the auxiliary segmentation tool to annotate a plurality of extreme points (e.g., points that denote one or more boundaries or edges of an object of interest in the image), and the to-be-segmented image is generated according to the extreme points. It may be understood that, the image processing device provided in this application may be deployed on a terminal device.

Specifically, in some embodiments, the plurality of extreme points may be the highest point, the lowest point, the leftmost point, and the rightmost point (e.g., boundary points, edge points, etc.) of a target object in the to-be-segmented image, or may be a plurality of extreme points in the to-be-segmented image. This is not limited herein.

102. Generate first image feature information according to the to-be-segmented image. The first image feature information includes N image matrices and a first heatmap, the first heatmap being generated according to the plurality of extreme points, N being an integer greater than or equal to 1.

In this embodiment, an image region segmentation apparatus generates N image matrices according to the to-be-segmented image, generates a first heatmap according to the plurality of extreme points, and combines the first heatmap and the N image matrices to obtain first image feature information corresponding to the to-be-segmented image.

Digital image data may be represented by using a matrix. If a size of the read to-be-segmented image is 128*128 pixels, a size of the image matrix is 128*128*N, N being an integer greater than or equal to 1. When N is 1, the image matrix may be a matrix corresponding to a grayscale image. When N is 3, the image matrix may be a matrix of a red green blue (RGB) image. The RGB image has three dimensions, and the three dimensions respectively represent three components: red, green, and blue. A size of the component is 0 to 255, and each pixel is a combination of the three components. Each RGB channel corresponds to one image matrix (that is, a first image matrix, a second image matrix, and a third image matrix), and therefore, the three RGB channels are superimposed to form a color image, that is, a to-be-segmented image is obtained. When N is 4, the image matrix may be a red green blue Alpha (RGBA) color space. For portable network graphics (PNG), there are also four image matrices, and a value of N is not limited herein.

103. Obtain a first image segmentation region corresponding to the first image feature information by using a first image segmentation model. The first image segmentation model includes a first heatmap channel and N first matrix channels, the N first matrix channels having a one-to-one correspondence with the N image matrices, the first heatmap channel being corresponding to the first heatmap. The correspondence proposed herein may be interpreted as follows: if an image matrix a corresponds to a first matrix channel a, when a first image segmentation region corresponding to image feature information is obtained by using an image segmentation model, the image matrix a is inputted into the image segmentation model via the first matrix channel a. The correspondence between the first heatmap and the first heatmap channel also identifies such an input manner.

In this embodiment, the image processing device inputs the first image feature information into the first image segmentation model, where the first image segmentation model may adopt a deep lab structure, including, but not limited to DeepLabV1, DeepLabV2, DeepLabV3, and DeepLabV3+. The DeepLabV2 structure is a CNN model structure used for image segmentation. An image is inputted, then a mask image of the same size as the original image is outputted, and a value of each pixel in the image represents a class label value to which the pixel belongs. DeepLabV3+ is a CNN model structure used for image segmentation, which is improved based on DeeplabV2, and usually can have better performance in an image segmentation competition. As a development of the neural network model, the CNN replaces a fully connected layer structure in an artificial neural network with a convolutional layer, and achieves excellent performance in various computer vision fields.

According to this application, a structure of the first image segmentation model needs to be improved. A first-layer parameter of the first image segmentation model is modified to enable the first image segmentation model to receive image data of (N+1) channels, that is, the first image segmentation model includes N first matrix channels and one first heatmap channel. Assuming that N is 3, it indicates that there are three image matrices. In this case, there are three corresponding first matrix channels, each first matrix channel corresponding to one image matrix. In addition, there is also one first heatmap channel, the first heatmap channel corresponding to the first heatmap.

Similarly, assuming that N is 1, it indicates that there is one image matrix. In this case, there is one corresponding first matrix channel, the one first matrix channel corresponding to one image matrix of a grayscale image. In addition, there is also one first heatmap channel, the first heatmap channel corresponding to the first heatmap.

Similarly, assuming that N is 4, it indicates that there are four image matrices. In this case, there are four corresponding first matrix channels, each first matrix channel corresponding to one image matrix. In addition, there is also one first heatmap channel, the first heatmap channel corresponding to the first heatmap.

104. Obtain a second heatmap according to an annotation point corresponding to the first image segmentation region and the first image segmentation region.

In this embodiment, the image processing device receives an annotation point, where there may be one or more annotation points, and the annotation point is obtained through annotation by the user according to the first image segmentation region. The image region segmentation apparatus generates a second heatmap according to the annotation point. A generation manner of the second heatmap is similar to that of the first heatmap, and details are not repeated herein.

It may be understood that, compared with a target object actually to be recognized in the to-be-segmented image, the first image segmentation region may include a region that is missed out in recognition and an excess region that is recognized. The region that is missed out in recognition may be understood as a part, which is not located in the first image segmentation region, of the target object, and the excess region that is recognized may be understood as a region that is in the first image segmentation region and that obviously does not belong to the target object.

An annotation point corresponding to the region that is missed out in recognition may be at the edge or not at the edge. The annotation point corresponding to the region that is missed out in recognition is a negative point, and may be denoted by −1. If the annotation point is a negative point, −1 is used for multiplication when a Gaussian distribution (that is, the second heatmap) is generated.

An annotation point corresponding to the excess region that is recognized may be at the edge or not at the edge. The annotation point corresponding to the excess region that is recognized is a positive point, and may be denoted by 1. If the annotation point is a positive point, 1 is used for multiplication when a Gaussian distribution (that is, the second heatmap) is generated.

105. Obtain a second image segmentation region corresponding to the to-be-segmented image by using a second image segmentation model. The second image segmentation model includes a segmentation region channel, a second heatmap channel, and N second matrix channels, the N second matrix channels having a one-to-one correspondence with the N image matrices, the segmentation region channel of the second image segmentation model corresponding to the first image segmentation region, the second heatmap channel corresponding to the second heatmap.

In this embodiment, the image processing device combines the second heatmap, the first image segmentation region, and the N image matrices of the to-be-segmented image to obtain second image feature information corresponding to the to-be-segmented image, and then inputs the second image feature information into the second image segmentation model, the second image segmentation model including N second matrix channels, a segmentation region channel, and a second heatmap channel, the N second matrix channels having a one-to-one correspondence with the N image matrices, the segmentation region channel corresponding to the first image segmentation region, the second heatmap channel corresponding to the second heatmap.

106. Generate an image recognition result of the to-be-segmented image according to the second image segmentation region.

The image processing device may further generate an image recognition result of the to-be-segmented image according to the second image segmentation region, and specifically, the second image segmentation region and the first image segmentation region are both mask images. An edge of the target object in the to-be-segmented image may be obtained based on the mask images, and an image recognition result is finally obtained. The image recognition result may be displayed by using text information, for example, the image recognition result is an object such as a "monkey" or a "car". The image recognition result may be a target object highlighted in the to-be-segmented image, and the target object may be an object such as a "car" or a "monkey".

According to an embodiment of this application, an image region segmentation method is provided. A to-be-segmented image is first obtained, the to-be-segmented image including a plurality of extreme points (e.g., boundary points, edge points etc.). For example, in some embodiments, the extreme points correspond to the boundaries (e.g., edges) of a target object in the to-0be-segmented image. First image feature information is generated according to the to-be-segmented image. A first image segmentation region corresponding to the first image feature information is obtained by using a first image segmentation model. A second heatmap is obtained based on the first image segmentation region, the second heatmap being generated according to an annotation point. A second image segmentation region corresponding to the to-be-segmented image is obtained by using a second image segmentation model. Through the foregoing manner, a process of image segmentation is divided into two stages. A region with a relatively poor segmentation effect in image segmentation at the first stage may be further segmented by using auxiliary segmentation at the second stage, so as to obtain a more accurate image segmentation result. There is no need to spend a lot of time on correcting the image segmentation result, thereby improving image segmentation performance. In addition, the image recognition result of the to-be-segmented image may be generated according to the second image segmentation region, thereby improving recognition accuracy.

In some embodiments, based on the embodiments corresponding to FIG. 3, the obtaining a to-be-segmented image includes:

receiving an object annotation instruction for a to-be-processed image, the to-be-processed image including a target object, the object annotation instruction carrying location information of a plurality of extreme points corresponding to the target object, the plurality of extreme points being used for identifying a contour edge of the target object.

Figure 4:
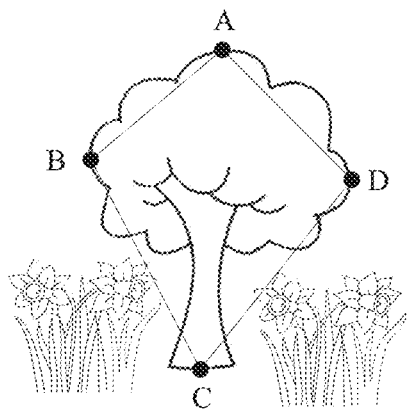
FIG. 4 is a schematic diagram of an embodiment of selecting four extreme points according to an embodiment of this application.

To identify the target object, the extreme points may be determined by using peripheries of the contour edge of the target object, for example, extreme points in four directions of up, down, left, and right, as shown in FIG. 4. In this case, there may be four extreme points. Correspondingly, location information of the four extreme points includes first extreme point location information, second extreme point location information, third extreme point location information, and fourth extreme point location information; and generating, in response to the object annotation instruction, the to-be-segmented image according to the to-be-processed image.

In this embodiment, an annotation manner based on extreme points is described, and the user may use the auxiliary segmentation tool to annotate a plurality of extreme points. For ease of understanding, FIG. 4 is a schematic diagram of an embodiment of selecting four extreme points according to an embodiment of this application. As shown in FIG. 4, a to-be-processed image is first displayed, the to-be-processed image including a target object, for example, including flowers, haystacks, and a tree. In actual application, the target object includes, but is not limited to a person, an animal, a car, or the like. After the auxiliary segmentation tool is enabled, the user may trigger an object annotation instruction; for example, a plurality of extreme points are selected from the to-be-processed image by using a click selection manner. Using FIG. 4 as an example, assuming that the target object is a tree, the user selects four extreme points of the tree by using the auxiliary segmentation tool, that is, a first extreme point A, a second extreme point B, a third extreme point C, and a fourth extreme point D. The object annotation instruction specifically carries coordinate information of the four extreme points, and therefore, a to-be-segmented image corresponding to the to-be-processed image is generated according to the object annotation instruction. The to-be-segmented image is an image corresponding to the tree shown in FIG. 4, and the to-be-segmented image includes a region formed by the first extreme point A, the second extreme point B, the third extreme point C, and the fourth extreme point D.

Figure 5:
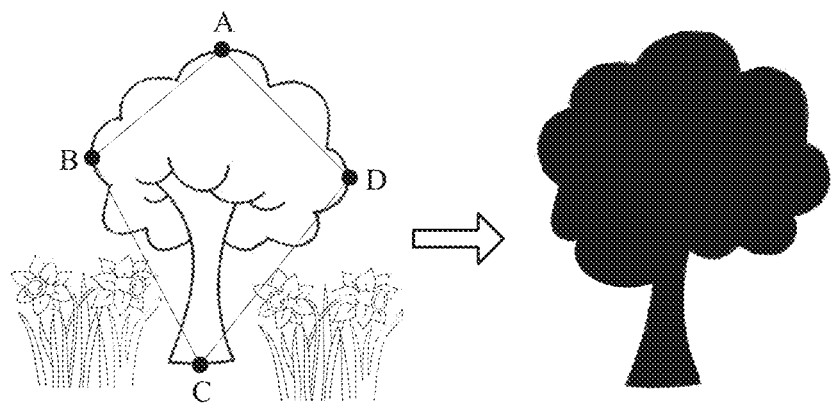
FIG. 5 is a schematic diagram of an embodiment of returning a first image segmentation region by a first image segmentation model according to an embodiment of this application.

The auxiliary segmentation tool generates first image feature information (including a first heatmap and N image matrices) according to the to-be-segmented image, and then obtains a first image segmentation region corresponding to the first image feature information by using a first image segmentation model. FIG. 5 is a schematic diagram of an embodiment of returning a first image segmentation region by a first image segmentation model according to an embodiment of this application. As shown in FIG. 5, the auxiliary segmentation tool calculates a first image segmentation region according to four extreme points, and returns the first image segmentation region. For example, an image corresponding to a shaded area in FIG. 5 is the image segmentation region. It may be understood that the image segmentation region may be a pre-segmented polygon result, and FIG. 5 is merely an example and is not to be understood as a limitation on this application.

Secondly, in this embodiment of this application, a method for annotating extreme points is provided. A to-be-processed image is displayed first; and then an object annotation instruction is received, the object annotation instruction carrying first extreme point location information, second extreme point location information, third extreme point location information, and fourth extreme point location information corresponding to the target object; and finally a to-be-segmented image is generated according to the to-be-processed image in response to the object annotation instruction. Through the foregoing manner, the auxiliary segmentation tool can be used to annotate a to-be-processed image. The auxiliary segmentation tool is easy to operate and convenient to use, thereby improving the feasibility and operability of the solution.

In some embodiments, based on the embodiments corresponding to FIG. 3, the obtaining a second heatmap according to the first image segmentation region may include:

receiving a first annotation instruction, the first annotation instruction corresponding to M annotation points, the annotation point being located inside the first image segmentation region, M is an integer greater than or equal to 1; and generating, in response to the first annotation instruction, the second heatmap according to the M annotation points corresponding to the first annotation instruction.

Figure 6:
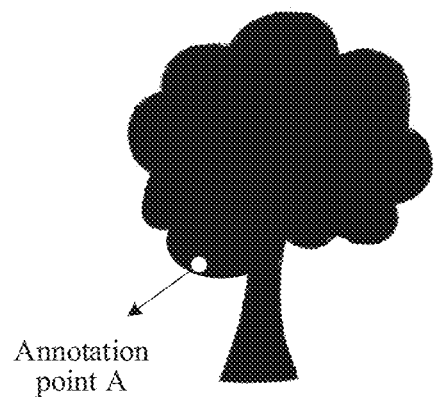
FIG. 6 is a schematic diagram of an annotation location based on a first image segmentation region according to an embodiment of this application.

In this embodiment, a method for generating a second heatmap according to an annotation point is described. For ease of description, FIG. 6 is a schematic diagram of an annotation location based on a first image segmentation region according to an embodiment of this application. As shown in FIG. 6, assuming that the first image segmentation region has an excess region that does not belong to a target object (for example, a tree). The user marks M annotation points in the excess region by using the auxiliary segmentation tool, M is an integer greater than or equal to 1. M annotation points are located inside the first image segmentation region, that is, the annotation is performed on the excess region in the first image segmentation region, for example, an annotation point A is obtained through marking in FIG. 6.

It may be understood that, an annotation point corresponding to an excess region that is recognized may be at the edge or not at the edge, which is not limited herein. In addition, the annotation point corresponding to the excess region that is recognized is a positive point and is denoted by 1.

Secondly, in this embodiment of this application, a method for generating a second heatmap according to an annotation point is provided, that is: receiving a first annotation instruction, and generating, in response to the first annotation instruction, the second heatmap according to the M annotation points carried in the first annotation instruction. Through the foregoing manner, the auxiliary segmentation tool can be used to perform secondary annotation on the first image segmentation region obtained through preliminary prediction. On the one hand, the auxiliary segmentation tool is easy to operate and convenient to use; on the other hand, a more accurate image segmentation result can be generated through the secondary annotation, thereby improving the operability and feasibility of the solution.

In some embodiments, based on the embodiments corresponding to FIG. 3, the obtaining a second heatmap according to the first image segmentation region may include:

receiving a second annotation instruction, the second annotation instruction corresponding to M annotation points, the annotation point is located outside the first image segmentation region, M is an integer greater than or equal to 1; and generating, in response to the second annotation instruction, the second heatmap according to the M annotation points corresponding to the second annotation instruction.

Figure 7:
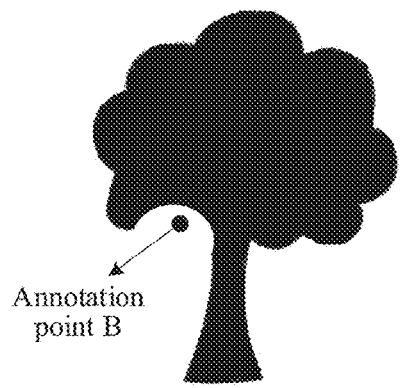
FIG. 7 is a schematic diagram of another annotation location based on a first image segmentation region according to an embodiment of this application.

In this embodiment, another method for generating a second heatmap according to an annotation point is described. For ease of description, FIG. 7 is a schematic diagram of another annotation location based on a first image segmentation region according to an embodiment of this application. As shown in FIG. 7, assuming that the first image segmentation region has one region missing, and the region is supposed to belong to the target object (for example, a tree). The user marks M annotation points in the region by using the auxiliary segmentation tool, M being an integer greater than or equal to 1. M annotation points are located inside the first image segmentation region, that is, annotation is performed on the missing region of the target object, for example, an annotation point B is obtained through marking in FIG. 7.

It may be understood that, an annotation point corresponding to a region that is missed out in recognition may be at the edge or not at the edge, which is not limited herein. In addition, the annotation point corresponding to the region that is missed out in recognition is a negative point and is denoted by −1. If the annotation point is a negative point, −1 is used for multiplication when a Gaussian distribution is generated.

Secondly, in this embodiment of this application, another method for generating a second heatmap according to an annotation point is provided, that is: receiving a second annotation instruction, and generating, in response to the second annotation instruction, the second heatmap according to the M annotation points carried in the second annotation instruction. Through the foregoing manner, the auxiliary segmentation tool can be used to perform secondary annotation on the first image segmentation region obtained through preliminary prediction. On the one hand, the auxiliary segmentation tool is easy to operate and convenient to use; on the other hand, a more accurate image segmentation result can be generated through the secondary annotation, thereby improving the operability and feasibility of the solution.

In some embodiments, based on the embodiments corresponding to FIG. 3, for step 102 in FIG. 3, the N first matrix channels include a red channel, a green channel, and a blue channel, and the generating first image feature information according to the to-be-segmented image may include:

generating the first heatmap according to the plurality of extreme points (e.g., boundary points, edge points etc.) in the to-be-segmented image;

generating N image matrices according to the to-be-segmented image, the N image matrices including a first image matrix corresponding to the red channel, a second image matrix corresponding to the green channel, and a third image matrix corresponding to the blue channel; and generating the first image feature information according to the first heatmap, the first image matrix, the second image matrix, and the third image matrix.

Figure 8:
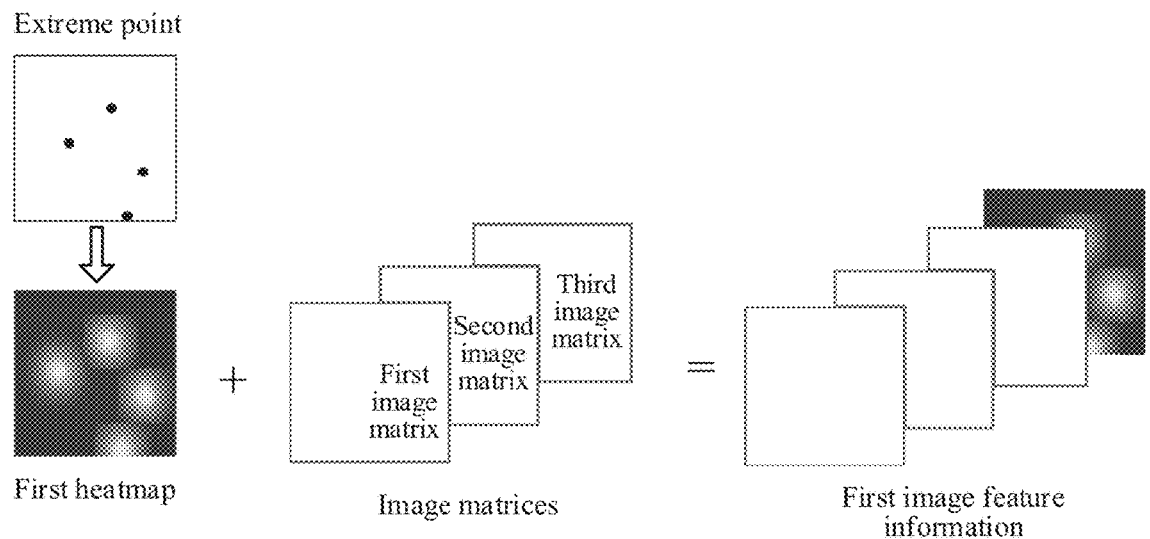
FIG. 8 is a schematic diagram of an embodiment of generating first image feature information according to an embodiment of this application.

In this embodiment, a method for generating first image feature information is described by using an example of N=3 matrix channels and 1 first heatmap channel. For ease of understanding, FIG. 8 is a schematic diagram of an embodiment of generating first image feature information according to an embodiment of this application. As shown in FIG. 8, according to this application, an image matrix of four channels is inputted by using an input format of deep extreme cut (DEXTR). That is, an input of the first image segmentation model adopted in this application further includes information of four extreme points in addition to the original image. To fully utilize the information of the four extreme points, a heatmap with the same size as the to-be-segmented image, that is, the first heatmap, is generated. That is, as shown in FIG. 8, a 2D Gaussian distribution is generated by using coordinates of the four extreme points as centers respectively, and then the first heatmap is used as an input of the first heatmap channel (that is, the fourth matrix channel) to be combined with the other three image matrices to obtain the first image feature information, and finally the first image feature information is used as an input of the first image segmentation model.

The three image matrices are respectively a first image matrix, a second image matrix, and a third image matrix. The first image matrix corresponds to a red (R) input channel, the second image matrix corresponds to a green (G) input channel, and the third image matrix corresponds to a blue (B) input channel.

A large quantity of data may be simply aggregated by using the first heatmap, and may be represented by using a progressive color band. A final effect is generally better than a direct display of discrete points, which can intuitively show the density or frequency of spatial data. The principle of heatmap generation is mainly divided into four steps, which are specifically as follows:

(1) setting a radius and create a buffer for each discrete point;
(2) filling the buffer of each discrete point by using a progressive grayscale band from the inside to the outside and from shallow to deep;
(3) stacking grayscale values for a region with overlapping buffers because the grayscale values may be stacked, where a region with more overlapping buffers has a larger grayscale value and is hotter; and
(4) using the stacked grayscale value as an index, mapping a color from a color band with 256 colors, and recoloring the image, to generate a heatmap.

It may be understood that, in actual application, there are other manners for generating a heatmap. For example, four solid circles may be directly constructed with each extreme point as the center. A feature of the 2D Gaussian distribution is that: a point closer to the center point has a larger value, and the value decreases rapidly as the distance from the center point increases. According to this application, when the first heatmap is inputted, some prior knowledge is given to the first image segmentation model, to let the first image segmentation model know that the four points are extreme points selected by the user. However, considering that the user may not select real extreme points and there may be some errors, the distribution of the first heatmap is generated by using the extreme points as the centers.

Secondly, in this embodiment of this application, a method for generating first image feature information according to a to-be-segmented image is provided. A first heatmap is generated according to a plurality of extreme points in the to-be-segmented image, a first image matrix is generated according to the to-be-segmented image, a second image matrix is generated according to the to-be-segmented image, and a third image matrix is generated according to the to-be-segmented image. Through the foregoing manner, extreme points selected by the user are fully considered, and a generated heatmap may better provide effective information, so as to improve feasibility and operability of the solution.

In some embodiments, based on the embodiments corresponding to FIG. 3, for step 102 in FIG. 3, the N second matrix channels include a red channel, a green channel, and a blue channel, and the N image matrices are determined by using the following manner:

generating N image matrices according to the to-be-segmented image, the N image matrices including a first image matrix corresponding to the red channel, a second image matrix corresponding to the green channel, and a third image matrix corresponding to the blue channel.

For step 104, after the obtaining a second heatmap according to an annotation point corresponding to the first image segmentation region and the first image segmentation region, the method may further include:

generating second image feature information according to the first image segmentation region, the second heatmap, the first image matrix, the second image matrix, and the third image matrix, the second image feature information being input information of the second image segmentation model when obtaining the second image segmentation region.

Figure 9:
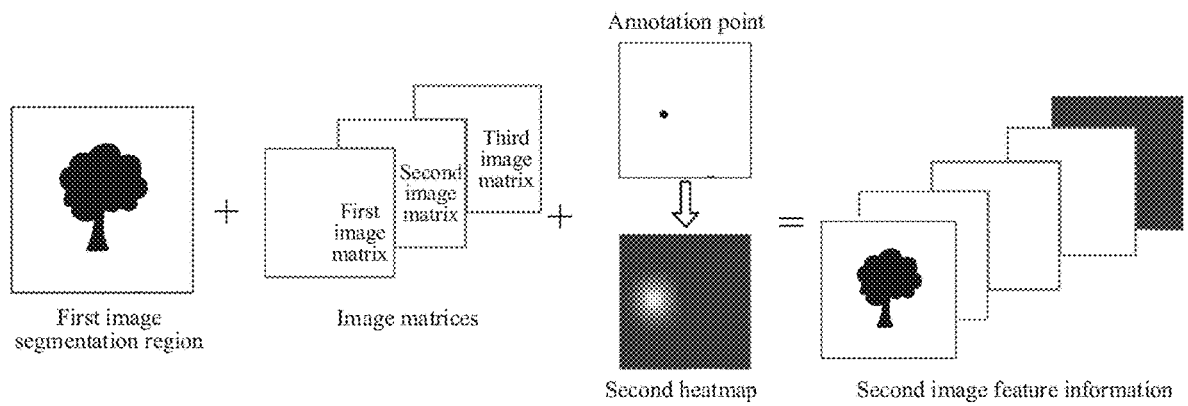
FIG. 9 is a schematic diagram of an embodiment of generating second image feature information according to an embodiment of this application.

In this embodiment, a method for generating second image feature information is described by using an example of N=3 matrix channels, 1 segmentation region channel, and 1 second heatmap channel. For ease of understanding, FIG. 9 is a schematic diagram of an embodiment of generating second image feature information according to an embodiment of this application. As shown in FIG. 9, according to this application, an image matrix of five channels is inputted by using the input format of DEXTR. That is, an input of the second image segmentation model adopted in this application includes information of the annotation point and the first image segmentation region outputted by the first image segmentation model, in addition to the original image. To fully utilize the information of the M annotation points, a heatmap with the same size as the to-be-segmented image, that is, the second heatmap, is generated. That is, as shown in FIG. 9, a 2D Gaussian distribution is generated by using coordinates of the M annotation points as centers respectively, then the second heatmap is used as an input of the second heatmap channel (that is, the fourth matrix channel), the first image segmentation region is used as an input of a segmentation region channel (that is, the fifth matrix channel), the inputs are combined with the other three image matrices to obtain the second image feature information, and finally the second image feature information is used as an input of the second image segmentation model. The three image matrices are respectively a first image matrix, a second image matrix, and a third image matrix. The first image matrix corresponds to an R input channel, the second image matrix corresponds to a G input channel, and the third image matrix corresponds to a B input channel.

According to this application, when the second heatmap is inputted, some prior knowledge is given to the second image segmentation model, to let the second image segmentation model know that the annotation points are selected by the user. However, considering that the user may not select optimal annotation points, the distribution of the second heatmap is generated by using the annotation points as the centers.

Secondly, in this embodiment of this application, a method for generating second image feature information according to a to-be-segmented image is provided. After the second heatmap is obtained according to the first image segmentation region, a first image matrix may be generated according to the to-be-segmented image, a second image matrix may be generated according to the to-be-segmented image, a third image matrix may be generated according to the to-be-segmented image, and second image feature information may be generated according to the first image segmentation region, the second heatmap, the first image matrix, the second image matrix, and the third image matrix, the second image feature information being input information of the second image segmentation model. Through the foregoing manner, annotation points selected by the user are fully considered, and a generated heatmap may better provide effective information, so as to improve feasibility and operability of the solution.

In some embodiments, based on the embodiments corresponding to FIG. 3, obtaining a second image segmentation region corresponding to the to-be-segmented image by using a second image segmentation model includes:

encoding the second image feature information by using an encoder of the second image segmentation model to obtain a first feature map and a second feature map, the encoder including a middle flow module and an atrous depthwise separable convolution, where the atrous depthwise separable convolution is configured to extract a feature map of the second image feature information, and the middle flow module is configured to perform T repetitions, T being an integer greater than 8;

concatenating the first feature map and the second feature map to obtain a target feature map; and decoding the target feature map by using a decoder of the second image segmentation model to obtain the second image segmentation region.

In this embodiment, a structure of the second image segmentation model is described. According to this application, two models are adopted, which are the first image segmentation model and the second image segmentation model respectively. First, a mask is obtained by using the first image segmentation model at the first stage, and a boundary point of a correction region corresponding to the mask is marked in an interaction manner, a Gaussian center is formed at the boundary point to form a first heatmap corresponding to an instance size, and finally the original image, the mask (that is, the first image segmentation region) generated by the first image segmentation model, and the first heatmap form an input matrix with 5 channels. The input matrix is inputted into the second image segmentation region at the second stage to obtain a corresponding segmentation result.

An example in which the second image segmentation model is a structure based on DeeplabV3+ version (DeeplabV3+) is used in this application for description. It may be understood that, DeeplabV2 model structure, U-Net, Mask Region-CNN (Mask R-CNN), pyramid scene parsing network (PSPNet), or the like may also be adopted. It may be understood that, the first image segmentation model may also adopt DeeplabV3+. DeeplabV3+ is an efficient and fast semantic segmentation algorithm that can handle multi-scale instances.

Figure 10:
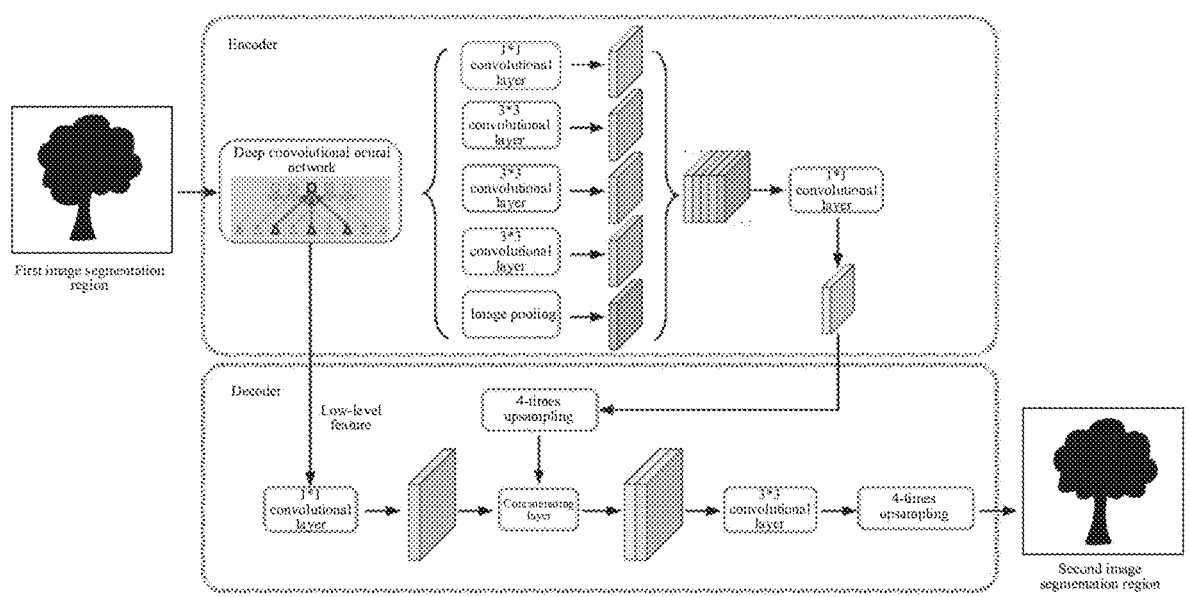
FIG. 10 is a schematic structural diagram of a second image segmentation model according to an embodiment of this application.

For ease of understanding, FIG. 10 is a schematic structural diagram of a second image segmentation model according to an embodiment of this application. As shown in FIG. 10, after the second image feature information is obtained, the second image feature information is inputted into the second image segmentation model. The second image segmentation model includes an encoder and a decoder. The encoder is configured to obtain rich high-level semantic information, and the decoder is configured to gradually restore boundary information.

The image feature information is encoded by using a deep convolutional neural network (DCNN) in the encoder, that is, restoring the resolution that is 4 times higher by using a bilinear interpolation, to obtain the first feature map. A quantity of channels is reduced by using 1*1 convolution processing, so as to extract low-level features of the image feature information, that is, to obtain the second feature map. The first feature map and the second feature map are concatenated by using a concatenation layer in the decoder of the image segmentation model to obtain a target feature map. The target feature map is enhanced by using a 3*3 convolution, and the resolution that is 4 times higher is further restored for the size of the to-be-segmented image by using an interpolation.

Figure 11:
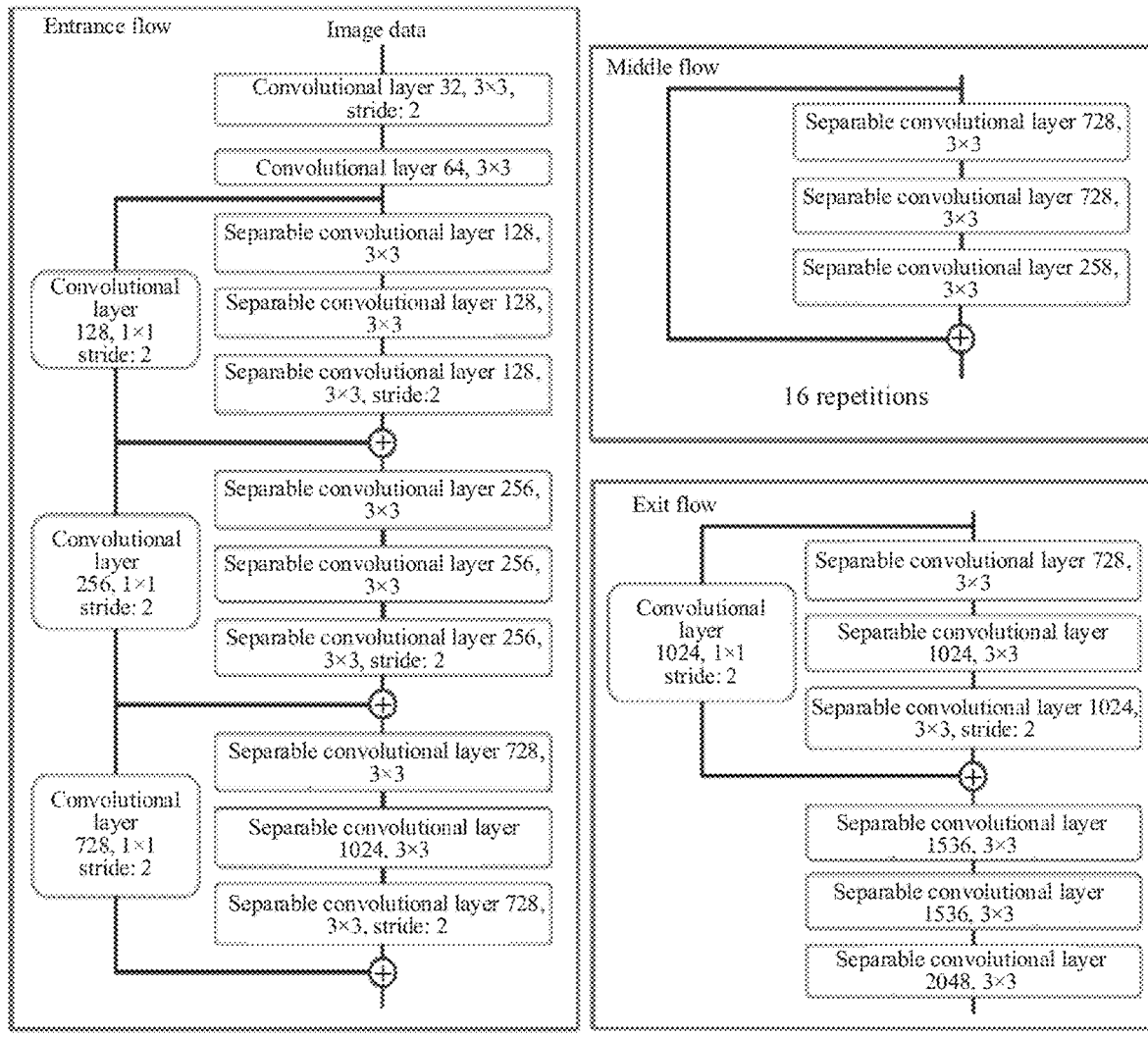
FIG. 11 is a schematic structural diagram of an Xception model according to an embodiment of this application.

It may be understood that, the encoder mainly includes an improved extreme inception (Xception) and an atrous space pyramid. For ease of understanding, FIG. 11 is a schematic structural diagram of an Xception model according to an embodiment of this application. As shown in FIG. 11, the improved Xception is configured to perform feature extraction on an image. Specific structure parameters are as shown in FIG. 11, and details are not repeated herein. The middle flow module in the original Xception performs 8 repetitions, and the improved middle flow module performs at least 9 repetitions. This application uses 16 repetitions as an example, but it is not limited thereto.

Figure 12:
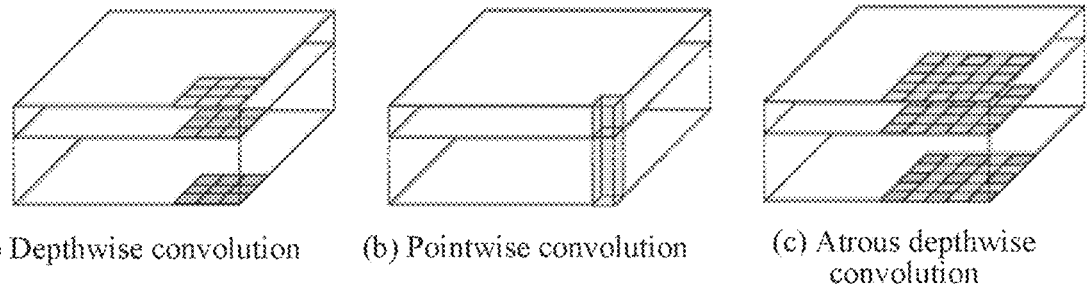
FIG. 12 is a schematic diagram of an atrous depthwise separable convolution according to an embodiment of this application.

The encoder further includes an atrous depthwise separable convolution to replace all maximum pooling operations in the encoder with depthwise separable convolutions having a stride. Therefore, this application may use the atrous separable convolution to extract a feature map by using any resolution. A schematic diagram of an atrous separable convolution model is shown in FIG. 12. FIG. 12 is a schematic diagram of an atrous depthwise separable convolution according to an embodiment of this application. After the feature maps (the first feature map and the second feature map) are separated according to the channels, a convolution is performed by using a depthwise convolution operation in FIG. 12(*a*); the obtained results are connected according to the channels and then a pointwise convolution operation in FIG. 12(*b*) is performed, to obtain a result of the depthwise separable convolution. In addition, the depthwise convolution in FIG. 12(*a*) is replaced with the atrous depthwise convolution in FIG. 12(*c*), and then the pointwise convolution in FIG. 12(*b*) is performed, to implement the atrous depthwise separable convolution operation.

The encoder adds batch normalization and a rectified linear unit (ReLU) activation function after each 3×3 depthwise separable convolution. The improved Xception has stronger feature extraction performance, and the depthwise separable convolution can greatly reduce the quantity of parameters and the amount of calculation while ensuring the model performance.

The encoder uses an atrous space pyramid, and the atrous space pyramid is configured to capture multi-scale information, so as to process instances of different scales. After the original image is processed by the improved Xception to reduce the resolution of the feature map to 1/16 of the original resolution, the feature map is inputted into the atrous space pyramid structure. As shown in the encoder part in FIG. 10, the atrous space pyramid is formed by a 1×1 convolution, three 3×3 atrous convolutions with a sampling rate={6, 12, 18}, and a global draw pooling, which are parallel to each other.

The results obtained after five parallel operations of the atrous space pyramid are connected according to the channels, and then a final output result of the encoder is obtained by using a 1×1 convolution operation, that is, the second image segmentation region is obtained.

Secondly, in this embodiment of this application, a method for obtaining a second image segmentation region by using the second image segmentation model is provided. That is, the second image feature information is encoded by an encoder of the second image segmentation model to obtain a first feature map and a second feature map; then the first feature map and the second feature map are concatenated to obtain a target feature map; and finally the target feature map is decoded by using a decoder of the second image segmentation model to obtain the second image segmentation region. Through the foregoing manner, the image segmentation region is predicted by using a model structure based on DeeplabV3+, and a total parameter quantity of the DeeplabV3+ model structure is relatively small. Therefore, the model structure has a relatively rapid running speed during both training and actual prediction, and can respond to user operations more rapidly when being applied to the auxiliary segmentation tool, thereby improving use efficiency and increasing user stickiness. In addition, the improved Xception model decreases a model size by using the depthwise separable convolution while ensuring the feature extraction performance, so as to improve the segmentation speed. In addition, the atrous space pyramid is used to construct multi-void rate convolution operations and pooling operations, to obtain multi-scale information, which may help the model process multi-scale instances.

In some embodiments, based on the embodiments corresponding to FIG. 3, decoding the target feature map by using a decoder of the second image segmentation model to obtain a second image segmentation region may include:

decoding the target feature map by using the decoder of the second image segmentation model to obtain a first pixel set and a second pixel set, the first pixel set including a plurality of first pixels, the second pixel set including a plurality of second pixels; and generating the second image segmentation region according to the first pixel set and the second pixel set.

In this embodiment, a method for generating a second image segmentation region based on the second image segmentation model is described. After the target feature map in the image segmentation region is decoded, a first pixel set and a second pixel set are obtained. The first pixel set belongs to pixels of the target object, and for example, may be denoted by "1"; the second pixel set belongs to the background, and for example, may be denoted by "0". The first pixel set and the second pixel set jointly form the second image segmentation region, that is, a segmentation result of the target object may be seen in the second image segmentation region.

The encoding-decoding structure may obtain edge information of an object by gradually restoring spatial information, and the DeeplabV3+ model structure adds a decoder to enhance the segmentation of the object edge based on the DeeplabV3 model structure.

The decoder in the DeeplabV3+ model uses high-level semantic information outputted by the encoder and a feature map with feature map resolution being ¼ of the original image resolution in the encoder for decoding. As shown in FIG. 10, a 1×1 convolution operation (the operation is mainly used for reducing a quantity of channels of the low-level feature map, so as to reduce a proportion of the low-level feature map) is performed on a low-level feature map with rich detail information outputted by the encoder, to obtain a new low-level feature map. 4-times sampling is performed on the high-level feature map with rich semantic information outputted by the encoder to obtain a new high-level feature map. The new low-level feature map and the new high-level feature map are concatenated according to the channels; a 3×3 convolution operation and then 4-times upsampling are performed on the obtained result, to obtain a feature map with the same size as the original image, which is used as a final output of the decoder. High-level semantic information and low-level detail information are used in the decoder to improve the model performance.

Further, in this embodiment of this application, a method for obtaining a second image segmentation region through decoding by using the second image segmentation model is provided. First, the target feature map is decoded by using a decoder of the second image segmentation model to obtain a first pixel set and a second pixel set, and the second image segmentation region is generated according to the first pixel set and the second pixel set. Through the foregoing manner, a specific basis is provided for the implementation of the solution, and the feature is decoded based on the structure of the second image segmentation model, which helps improve the application reliability of the second image segmentation model.

Figure 13:
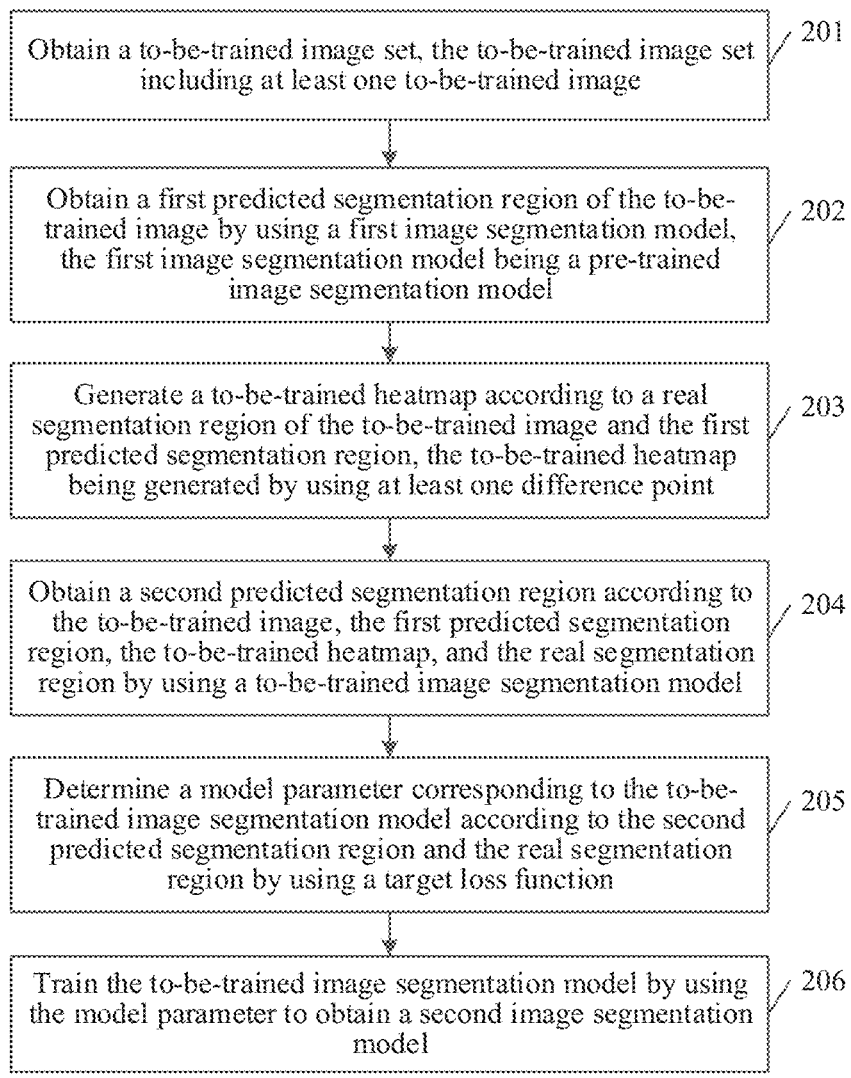
FIG. 13 is a schematic diagram of an embodiment of a model training method according to an embodiment of this application.

The model training method according to this application is described below with reference to the foregoing descriptions. Referring to FIG. 13, an embodiment of the model training method according to an embodiment of this application includes the following steps:

201. Obtain a to-be-trained image set, the to-be-trained image set including at least one to-be-trained image.

In this embodiment, a model training apparatus obtains a to-be-trained image set, the to-be-trained image set including at least one to-be-trained image, the to-be-trained image including an instance original image, for example, a "horse", a "person", a "television", a "building", or the like. It may be understood that, a train training set in a Pascal-VOC2012 data set may be adopted as the to-be-trained image set during model training, which is not limited herein.

202. Obtain a first predicted segmentation region of the to-be-trained image by using a first image segmentation model, the first image segmentation model being a pre-trained image segmentation model.

In this embodiment, the model training apparatus inputs the to-be-trained image into a pre-trained first image segmentation model, for the first image segmentation model to output a first predicted segmentation region corresponding to the to-be-trained image. The first predicted segmentation region includes a foreground and a background. A pixel in the foreground may be denoted by "1", and a pixel in the background may be denoted by "0". The first predicted segmentation region is a mask image.

203. Generate a to-be-trained heatmap according to a real segmentation region of the to-be-trained image and the first predicted segmentation region, the to-be-trained heatmap being generated by using at least one difference point.

In this embodiment, the model training apparatus automatically generates at least one difference point according to the first predicted segmentation region and the real segmentation region of the to-be-trained image, and then generates a corresponding to-be-trained heatmap by using the at least one difference point. The process of automatically generating at least one difference point is a process of simulating annotation point marking performed by a user. The real segmentation region is an actual segmentation region segmented based on the to-be-trained image.

204. Obtain a second predicted segmentation region according to the to-be-trained image, the first predicted segmentation region, the to-be-trained heatmap, and the real segmentation region by using a to-be-trained image segmentation model.

In this embodiment, the model training apparatus obtains four pieces of input information, which are a to-be-trained image (an original image), a first predicted segmentation region, a to-be-trained heatmap, and a real segmentation region respectively, and then trains the to-be-trained image segmentation model by using the four pieces of input information, that is, the to-be-trained image, the first predicted segmentation region, the to-be-trained heatmap, and the real segmentation region are inputted into the to-be-trained image segmentation model, and a corresponding second predicted segmentation region is outputted by using the to-be-trained image segmentation model, the second predicted segmentation region being a mask image.

205. Determine a model parameter corresponding to the to-be-trained image segmentation model according to the second predicted segmentation region and the real segmentation region by using a target loss function.

In this embodiment, the model training apparatus trains, based on the second predicted segmentation region and the real segmentation region, the to-be-trained image segmentation model required in the second stage by using the target loss function. The to-be-trained image set adopted during training may include 1464 to-be-trained images and 3507 instances. First, a first image segmentation model with the highest number of epochs in the first stage is selected, that is, a segmentation result of the first image segmentation model in the to-be-trained image set is not very good; the first image segmentation model is used to test the to-be-trained image set to obtain a corresponding first predicted segmentation region (a mask image); then a difference point of each instance original image is obtained, and a Gaussian center is generated at the difference point to form a to-be-trained heatmap; and finally an instance original image with a size of a*b (for example, 512*512), the first predicted segmentation region, the real segmentation region, and the to-be-trained heatmap are inputted into the to-be-trained image segmentation model for training.

During training, momentum is set to 0.9, weight decay is set to 0.0005, learning rate is set to $10^{-8}$, and a batch size (batchsize) is set to 5. 100 epochs are set in total, and the generated mask image of the to-be-trained image set is updated by using the trained to-be-trained image segmentation model every 5 epochs.

206. Train the to-be-trained image segmentation model by using the model parameter to obtain a second image segmentation model.

In this embodiment, when the target loss function converges, the model training apparatus determines a model parameter of the to-be-trained image segmentation model, the model parameter being used for updating the to-be-trained image segmentation model, so as to obtain a second image segmentation model.

In this embodiment of this application, a model training method is provided. That is, first, a to-be-trained image set is obtained; then a first predicted segmentation region of the to-be-trained image is obtained by using a first image segmentation model; next, a to-be-trained heatmap is generated according to a real segmentation region of the to-be-trained image and the first predicted segmentation region; a second predicted segmentation region is obtained according to the to-be-trained image, the first predicted segmentation region, the to-be-trained heatmap, and the real segmentation region by using a to-be-trained image segmentation model; and finally a model parameter corresponding to the to-be-trained image segmentation model is determined according to the second predicted segmentation region and the real segmentation region by using a target loss function, and the to-be-trained image segmentation model is trained by using the model parameter to obtain a second image segmentation model. Through the foregoing manner, a higher mean Intersection Over Union (mIOU) value may be obtained based on the segmentation algorithm at the first stage, so as to obtain the second image segmentation model through training, and the segmentation result of the image may be predicted more accurately based on the first image segmentation model and the second image segmentation model.

In some embodiments, based on the embodiments corresponding to FIG. 13, the target loss function may be expressed as:

Loss=Pos_loss*(Neg_num/Total_num)+Neg_loss*(Pos_num/Total_num);

where Loss represents the target loss function, Pos_loss represents a sum of positive sample losses of the second predicted segmentation region, Neg_loss represents a sum of negative sample losses of the second predicted segmentation region, Pos_num represents a number of positive samples in the real segmentation region, Neg_num represents a number of negative samples in the real segmentation region, and Total_num represents a sum of the number of the positive samples and the number of the negative samples.

In this embodiment, a specific implementation of the target loss function is described, that is, the target loss function is a cross entropy loss function using positive and negative balance. A probability graph is obtained by using a softmax function according to a result outputted by the decoder of the second image segmentation model, and a loss is calculated by comparing the probability graph with the real segmentation region. The loss function in this application adopts a cross entropy loss function of positive and negative balance. The cross entropy loss function of positive and negative balance considers the problem of the quantity of positive and negative samples based on the original standard cross entropy loss function, and proportions of the positive and negative samples are obtained by calculating the quantity of positive samples and the quantity of negative samples in the real segmentation region. After the cross entropy loss is calculated, a loss of the positive samples is multiplied by the proportion of the negative samples to obtain a product, and a loss of the negative samples is multiplied by the proportion of the positive samples to obtain a product. The two products are added together to obtain a final loss, and the cross entropy loss function of positive and negative balance (that is, the target loss function) may be expressed as:

Loss=Pos_loss*(Neg_num/Total_num)+Neg_loss*(Pos_num/Total_num);

where Loss represents the target loss function, Pos_loss represents a sum of positive sample losses of the second predicted segmentation region, Neg_loss represents a sum of negative sample losses of the second predicted segmentation region, Pos_num represents a number of positive samples in the real segmentation region, Neg_num represents a number of negative samples in the real segmentation region, and Total_num represents a sum of the number of the positive samples and the number of the negative samples. The positive sample is a positive point (that is, a foreground point) of the real segmentation region, and the negative sample is a negative point (that is, a background point) of the real segmentation region.

Secondly, in this embodiment of this application, a cross entropy loss using positive and negative balance is provided, so that the model can better process positive and negative losses during training. The model is prevented from tilting towards the direction of a larger quantity to cause a training failure, so as to improve reliability of training.

In some embodiments, based on the embodiments corresponding to FIG. 13, generating a to-be-trained heatmap according to a real segmentation region of the to-be-trained image and the first predicted segmentation region includes:

determining a difference map according to the real segmentation region and the first predicted segmentation region, the difference map representing a region in which the real segmentation region is not consistent with the first predicted segmentation region;

determining a first candidate region and a second candidate region according to the difference map;

selecting at least one difference point according to the first candidate region and the second candidate region; and generating the to-be-trained heatmap according to the at least one difference point.

In this embodiment, a method for automatically generating a to-be-trained heatmap is described. In an auxiliary segmentation algorithm at the second stage, a maximum difference point between the mask generated by using the auxiliary segmentation algorithm at the first stage and a real mask of the instance is required; however, there is no need to manually depict the maximum difference point during training. Therefore, the difference point is generated through simulation by using the following method.

Figure 14:
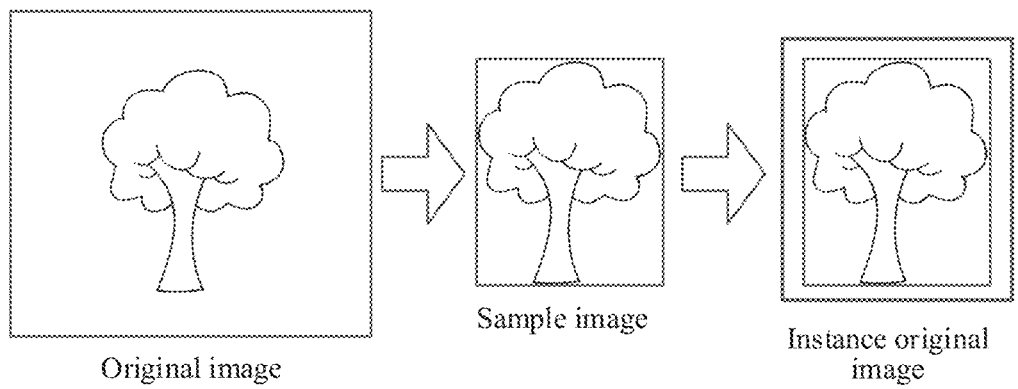
FIG. 14 is a schematic diagram of an instance original image according to an embodiment of this application.

Specifically, first, an original image, a real segmentation region corresponding to the original image, and a first predicted segmentation region outputted by the auxiliary segmentation model at the first stage are "bound", so that the original image, the real segmentation region, and the first predicted segmentation region have consistent correspondences when being read. For ease of understanding, FIG. 14 is a schematic diagram of an instance original image according to an embodiment of this application. As shown in FIG. 14, after an original image is read, because of the "binding" relationship, a pixel value on a real segmentation region corresponding to the original image may be used to extract an instance from the real segmentation region. Then four extreme points: an upper extreme point, a lower extreme point, a left extreme point, and a right extreme point corresponding to the instance are calculated. Then the original image, a real mask, and a generated mask are cut by using the four extreme points, to obtain corresponding instance parts. A sample image is extracted by using a BBox. Considering the factor of the background, the cutting is performed by floating 50 pixels around the BBox of the sample image to obtain the instance original image.

Pixels on the real mask (that is, the real segmentation region) and the generated mask (that is, the first predicted segmentation region) are padded with 0, and size adjustment is performed on the cut instance original image, the real mask of the instance, and the generated mask of the instance, to achieve resolution of 512*512. It may be understood that, the foregoing resolution is merely an example, and is not understood as a limitation to this application.

To obtain a difference point (which may be a maximum difference point) between the real mask (that is, the real segmentation region) and the generated mask (that is, the first predicted segmentation region), all difference points between the real mask (that is, the real segmentation region) and the generated mask (that is, the first predicted segmentation region) after the size adjustment need to be calculated first.

Figure 15:
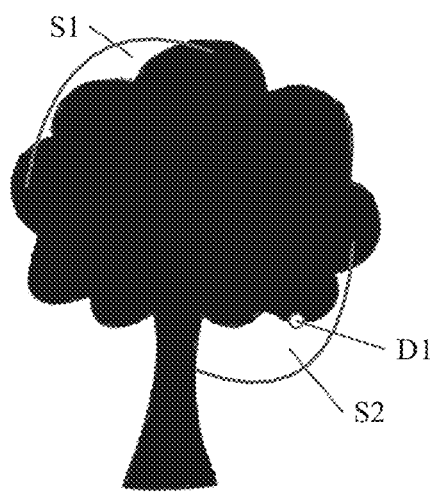
FIG. 15 is a schematic diagram of an embodiment of selecting a difference point according to an embodiment of this application.

For ease of understanding, FIG. 15 is a schematic diagram of an embodiment of selecting a difference point according to an embodiment of this application. As shown in FIG. 15, specifically, first, whether corresponding location pixels of the real mask (that is, the real segmentation region) and the generated mask (that is, the first predicted segmentation region) are consistent is determined, so as to obtain a difference map, and the difference map may be represented by a region S1 and a region S2 shown in FIG. 15. A connected domain is calculated for the difference map, and a largest region in the connected domain is obtained as a candidate region 1. The region S2 is larger than the region S1, and therefore, the region S2 is used as the candidate region 1. In addition, a boundary (or a center location) of the real mask (that is, the real segmentation region) of the instance is calculated, and the boundary (or the center location) is used as a candidate region 2. Finally, at least one difference point is randomly selected from an intersection of the candidate region 1 and the candidate region 2. For example, a point D1 shown in FIG. 15 is a randomly selected difference point. The to-be-trained heatmap may be generated according to the at least one difference point.

Secondly, in this embodiment of this application, a method for automatically generating a to-be-trained heatmap is provided, that is, a difference map is determined according to the real segmentation region and the first predicted segmentation region; then a first candidate region and a second candidate region are determined according to the difference map; next, at least one difference point is selected according to the first candidate region and the second candidate region, and finally the to-be-trained heatmap is generated according to the at least one difference point. Through the foregoing manner, there is no need to manually annotate a difference point during training; instead, an attention mechanism is used to generate a Gaussian center at a difference point between a generated predicted mask and a real mask to form a heatmap, so as to improve the attention of the model to the region.

Figure 16:
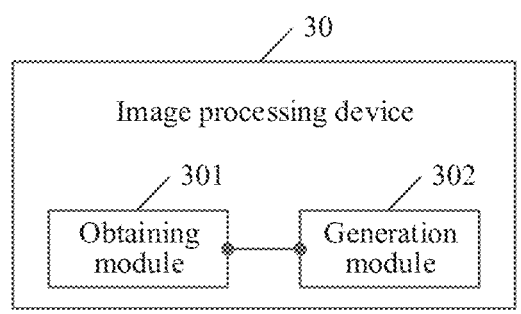
FIG. 16 is a schematic diagram of an embodiment of an image processing device according to an embodiment of this application.

An image processing device in this application is described below in detail. FIG. 16 is a schematic diagram of an embodiment of an image processing device according to an embodiment of this application. An image processing device 30 includes:

an obtaining module 301, configured to obtain a to-be-segmented image, the to-be-segmented image including a plurality of extreme points; and a generation module 302, configured to generate first image feature information according to the to-be-segmented image obtained by the obtaining module 301, the first image feature information including N image matrices and a first heatmap, the first heatmap is generated according to the plurality of extreme points, N is an integer greater than or equal to 1;

the obtaining module 301 is configured to obtain, by using a first image segmentation model, a first image segmentation region corresponding to the first image feature information generated by the generation module 302, the first image segmentation model including a first heatmap channel and N first matrix channels, the N first matrix channels being in one-to-one correspondence with the N image matrices, the first heatmap channel corresponding to the first heatmap;

the obtaining module 301 is further configured to obtain a second heatmap according to an annotation point corresponding to the first image segmentation region and the first image segmentation region;

the obtaining module 301 is further configured to obtain a second image segmentation region corresponding to the to-be-segmented image by using a second image segmentation model, the second image segmentation model including a segmentation region channel, a second heatmap channel, and N second matrix channels, the N second matrix channels being in one-to-one correspondence with the N image matrices, the segmentation region channel being corresponding to the first image segmentation region, the second heatmap channel being corresponding to the second heatmap; and the generation module 302 is configured to generate an image recognition result of the to-be-segmented image according to the second image segmentation region.

In this embodiment, the obtaining module 301 obtains a to-be-segmented image, the to-be-segmented image including a plurality of extreme points. The generation module 302 generates first image feature information according to the to-be-segmented image obtained by the obtaining module 301, the first image feature information including N image matrices and a first heatmap, the first heatmap is generated according to the plurality of extreme points, N is an integer greater than or equal to 1. The obtaining module 301 obtains, by using a first image segmentation model, a first image segmentation region corresponding to the first image feature information generated by the generation module 302, the first image segmentation model including N first matrix channels and a first heatmap channel, the N first matrix channels having a one-to-one correspondence with the N image matrices, the first heatmap channel corresponding to the first heatmap. The obtaining module 301 obtains a second heatmap according to the first image segmentation region, the second heatmap is generated according to an annotation point. The obtaining module 301 obtains a second image segmentation region corresponding to the to-be-segmented image by using a second image segmentation model, the second image segmentation model including N second matrix channels, a segmentation region channel, and a second heatmap channel, the N second matrix channels having a one-to-one correspondence with the N image matrices, the segmentation region channel corresponding to the first image segmentation region, the second heatmap channel corresponding to the second heatmap.

In this embodiment of this application, an image processing device is provided. Through the foregoing manner, a process of image segmentation is divided into two stages. A region with a relatively poor segmentation effect in image segmentation at the first stage may be further segmented by using auxiliary segmentation at the second stage, so as to obtain a more accurate image segmentation result. There is no need to spend a lot of time on correcting the image segmentation result, thereby improving image segmentation performance.

In some embodiments, based on the embodiment corresponding to FIG. 16, the image processing device 30 includes, the obtaining module 301 is specifically configured to receive an object annotation instruction for a to-be-processed image, the to-be-processed image including a target object, the object annotation instruction carrying location information of a plurality of extreme points corresponding to the target object, the plurality of extreme points is used for identifying a contour edge of the target object; and generate, in response to the object annotation instruction, the to-be-segmented image according to the to-be-processed image.

In some embodiments, the location information of the plurality of extreme points includes first extreme point location information, second extreme point location information, third extreme point location information, and fourth extreme point location information respectively identifying peripheries of the contour edge of the target object.

In some embodiments, a method for annotating extreme points is provided. Through the foregoing manner, the auxiliary segmentation tool can be used to annotate a to-be-processed image. The auxiliary segmentation tool is easy to operate and convenient to use, thereby improving the feasibility and operability of the solution.

In some embodiments, based on the embodiment corresponding to FIG. 16, in another embodiment of the image processing device 30 according to an embodiment of this application, the obtaining module 301 is specifically configured to receive a first annotation instruction, the first annotation instruction corresponding to M annotation points, the annotation point is located inside the first image segmentation region, M is an integer greater than or equal to 1; and generate, in response to the first annotation instruction, the second heatmap according to the M annotation points corresponding to the first annotation instruction.

Secondly, in this embodiment of this application, a method for generating a second heatmap according to an annotation point is provided. Through the foregoing manner, the auxiliary segmentation tool can be used to perform secondary annotation on a first image segmentation region obtained through preliminary prediction. On the one hand, the auxiliary segmentation tool is easy to operate and convenient to use; on the other hand, a more accurate image segmentation result can be generated through the secondary annotation, thereby improving the operability and feasibility of the solution.

In some embodiments, based on the embodiment corresponding to FIG. 16, in another embodiment of the image processing device 30 according to an embodiment of this application, the obtaining module 301 is specifically configured to receive a second annotation instruction, the second annotation instruction corresponding to M annotation points, the annotation point is located outside the first image segmentation region, M is an integer greater than or equal to 1; and generate, in response to the second annotation instruction, the second heatmap according to the M annotation points corresponding to the second annotation instruction.

Secondly, in this embodiment of this application, another method for generating a second heatmap according to an annotation point is provided. Through the foregoing manner, the auxiliary segmentation tool can be used to perform secondary annotation on a first image segmentation region obtained through preliminary prediction. On the one hand, the auxiliary segmentation tool is easy to operate and convenient to use; on the other hand, a more accurate image segmentation result can be generated through the secondary annotation, thereby improving the operability and feasibility of the solution.

In some embodiments, based on the embodiment corresponding to FIG. 16, the N first matrix channels include a red channel, a green channel, and a blue channel, and in another embodiment of the image processing device 30 according to an embodiment of this application, the generation module 302 is specifically configured to generate the first heatmap according to the plurality of extreme points in the to-be-segmented image;

generate N image matrices according to the to-be-segmented image, the N image matrices including a first image matrix corresponding to the red channel, a second image matrix corresponding to the green channel, and a third image matrix corresponding to the blue channel; and generate the first image feature information according to the first heatmap, the first image matrix, the second image matrix, and the third image matrix.

Secondly, in this embodiment of this application, a method for generating first image feature information according to a to-be-segmented image is provided. Through the foregoing manner, extreme points selected by the user are fully considered, and a generated heatmap may better provide effective information, so as to improve feasibility and operability of the solution.

In some embodiments, based on the embodiment corresponding to FIG. 16, in another embodiment of the image processing device 30 according to an embodiment of this application, the N second matrix channels include a red channel, a green channel, and a blue channel, and the generation module 302 is further configured to generate N image matrices according to the to-be-segmented image, the N image matrices including a first image matrix corresponding to the red channel, a second image matrix corresponding to the green channel, and a third image matrix corresponding to the blue channel; and generate second image feature information according to the first image segmentation region, the second heatmap, the first image matrix, the second image matrix, and the third image matrix, the second image feature information being input information of the second image segmentation model when obtaining the second image segmentation region.

Secondly, in this embodiment of this application, a method for generating second image feature information according to a to-be-segmented image is provided. Through the foregoing manner, annotation points selected by the user are fully considered, and a generated heatmap may better provide effective information, so as to improve feasibility and operability of the solution.

In some embodiments, based on the embodiment corresponding to FIG. 16, in another embodiment of the image processing device 30 according to an embodiment of this application, the obtaining module 301 is specifically configured to encode the second image feature information by using an encoder of the second image segmentation model to obtain a first feature map and a second feature map, the encoder including a middle flow module and an atrous depthwise separable convolution, the atrous depthwise separable convolution being configured to extract a feature map of the second image feature information, the middle flow module being configured to perform T repetitions, T being an integer greater than 8;

concatenate the first feature map and the second feature map to obtain a target feature map; and decode the target feature map by using a decoder of the second image segmentation model to obtain the second image segmentation region.

Secondly, in this embodiment of this application, a method for obtaining a second image segmentation region by using a second image segmentation model is provided. The image segmentation region is predicted by using a model structure based on DeeplabV3+, and a total quantity of parameters of the DeeplabV3+ model structure is relatively small. Therefore, the model structure has a relatively rapid running speed during both training and actual prediction, and can respond to user operations more rapidly when being applied to the auxiliary segmentation tool, thereby improving use efficiency and increasing user stickiness. In addition, the improved Xception model decreases a model size by using the depthwise separable convolution while ensuring the feature extraction performance, so as to improve the segmentation speed. In addition, the atrous space pyramid is used to construct multi-void rate convolution operations and pooling operations, to obtain multi-scale information, which may help the model process multi-scale instances.

In some embodiments, based on the embodiment corresponding to FIG. 16, in another embodiment of the image processing device 30 according to an embodiment of this application, the obtaining module 301 is specifically configured to decode the target feature map by using the decoder of the second image segmentation model to obtain a first pixel set and a second pixel set, the first pixel set including a plurality of first pixels, the second pixel set including a plurality of second pixels; and generate the second image segmentation region according to the first pixel set and the second pixel set.

Further, in this embodiment of this application, a method for obtaining a second image segmentation region through decoding by using the second image segmentation model is provided. First, the target feature map is decoded by using a decoder of the second image segmentation model to obtain a first pixel set and a second pixel set, and the second image segmentation region is generated according to the first pixel set and the second pixel set. Through the foregoing manner, a specific basis is provided for the implementation of the solution, and the feature is decoded based on the structure of the second image segmentation model, which helps improve the application reliability of the second image segmentation model.

Figure 17:
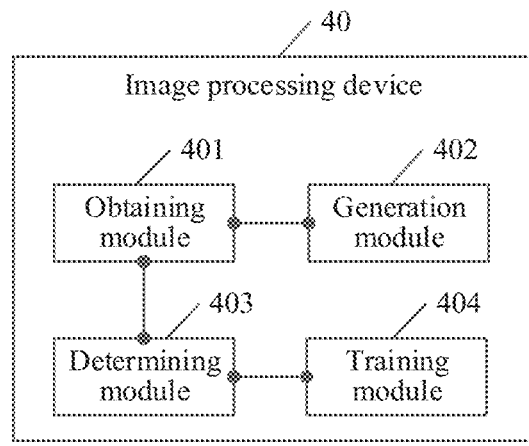
FIG. 17 is a schematic diagram of an embodiment of an image processing device according to an embodiment of this application.

A model training apparatus in this application is described below in detail. FIG. 17 is a schematic diagram of an embodiment of an image processing device according to an embodiment of this application. An image processing device 40 includes:

an obtaining module 401, configured to obtain a to-be-trained image set, the to-be-trained image set including at least one to-be-trained image, the obtaining module 401 is further configured to obtain a first predicted segmentation region of the to-be-trained image by using a first image segmentation model, the first image segmentation model being a pre-trained image segmentation model;

a generation module 402, configured to generate a to-be-trained heatmap according to a real segmentation region of the to-be-trained image and the first predicted segmentation region obtained by the obtaining module 401, the to-be-trained heatmap is generated by using at least one difference point, the obtaining module 401 is further configured to obtain a second predicted segmentation region according to the to-be-trained image, the first predicted segmentation region, the to-be-trained heatmap generated by the generation module 402, and the real segmentation region by using a to-be-trained image segmentation model;

a determining module 403, configured to determine a model parameter corresponding to the to-be-trained image segmentation model according to the second predicted segmentation region obtained by the obtaining module 401 and the real segmentation region by using a target loss function; and a training module 404, configured to train the to-be-trained image segmentation model by using the model parameter determined by the determining module 403, to obtain a second image segmentation model.

In this embodiment, the obtaining module 401 obtains a to-be-trained image set, the to-be-trained image set including at least one to-be-trained image. The obtaining module 401 obtains a first predicted segmentation region of the to-be-trained image by using a first image segmentation model, the first image segmentation model being a pre-trained image segmentation model. The generation module 402 generates a to-be-trained heatmap according to a real segmentation region of the to-be-trained image and the first predicted segmentation region obtained by the obtaining module 401, the to-be-trained heatmap being generated by using at least one difference point. The obtaining module 401 obtains a second predicted segmentation region according to the to-be-trained image, the first predicted segmentation region, the to-be-trained heatmap generated by the generation module 402, and the real segmentation region by using a to-be-trained image segmentation model. The determining module 403 determines a model parameter corresponding to the to-be-trained image segmentation model according to the second predicted segmentation region obtained by the obtaining module 401 and the real segmentation region by using a target loss function. The training module 404 trains the to-be-trained image segmentation model by using the model parameter determined by the determining module 403, to obtain a second image segmentation model.

In this embodiment of this application, a model training method is provided. Through the foregoing manner, a higher mIOU value may be obtained based on the segmentation algorithm at the first stage, so as to obtain the second image segmentation model through training, and the segmentation result of the image may be predicted more accurately based on the first image segmentation model and the second image segmentation model.

In some embodiments, based on the embodiment corresponding to FIG. 17, in another embodiment of the image processing device 40 according to an embodiment of this application, the target loss function is expressed as:

Loss=Pos_loss*(Neg_num/Total_num)+Neg_loss*(Pos_num/Total_num);

where Loss represents the target loss function, Pos_loss represents a sum of positive sample losses of the second predicted segmentation region, Neg_loss represents a sum of negative sample losses of the second predicted segmentation region, Pos_num represents a number of positive samples in the real segmentation region, Neg_num represents a number of negative samples in the real segmentation region, and Total_num represents a sum of the number of the positive samples and the number of the negative samples.

Secondly, in this embodiment of this application, a cross entropy loss using positive and negative balance is provided, so that the model can better process positive and negative losses during training. The model is prevented from tilting towards the direction of a larger quantity to cause a training failure, so as to improve reliability of training.

In some embodiments, based on the embodiment corresponding to FIG. 17, in another embodiment of the image processing device 40 according to an embodiment of this application, the generation module 402 is specifically configured to determine a difference map according to the real segmentation region and the first predicted segmentation region, the difference map representing a region in which the real segmentation region is not consistent with the first predicted segmentation region;

determine a first candidate region and a second candidate region according to the difference map;

select at least one difference point according to the first candidate region and the second candidate region; and generate the to-be-trained heatmap according to the at least one difference point.

Secondly, in this embodiment of this application, a method for automatically generating a to-be-trained heatmap is provided, that is, a difference map is determined according to the real segmentation region and the first predicted segmentation region; then a first candidate region and a second candidate region are determined according to the difference map; next, at least one difference point is selected according to the first candidate region and the second candidate region, and finally the to-be-trained heatmap is generated according to the at least one difference point. Through the foregoing manner, there is no need to manually annotate a difference point during training; instead, an attention mechanism is used to generate a Gaussian center at a difference point between a generated predicted mask and a real mask to form a heatmap, so as to improve the attention of the model to the region.

Figure 18:
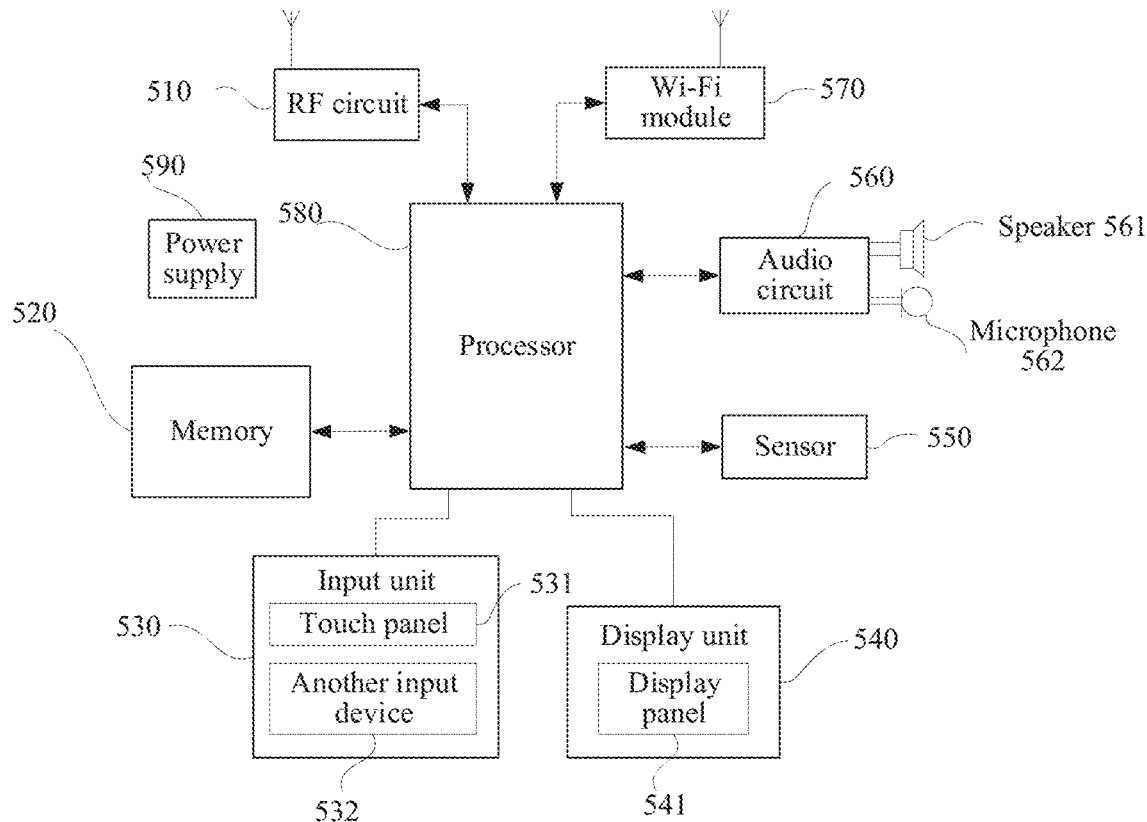
FIG. 18 is a schematic structural diagram of a terminal device according to an embodiment of this application.

An embodiment of this application further provides another image processing device. As shown in FIG. 18, for ease of description, only parts related to the embodiments of this application are shown. For specific technical details that are not disclosed, refer to the method part in the embodiments of this application. In this embodiment, the image processing device is a terminal device used for image region recognition.

The terminal device may be any terminal device including a mobile phone, a tablet computer, a personal digital assistant (PDA), a point of sales (POS), and an on-board computer, and the terminal device being a mobile phone is used as an example.

FIG. 18 is a block diagram of a partial structure of a mobile phone related to a terminal device according to an embodiment of this application. Referring to FIG. 18, the mobile phone includes components such as: a radio frequency (RF) circuit 510, a memory 520, an input unit 530, a display unit 540, a sensor 550, an audio circuit 560, a wireless fidelity (Wi-Fi) module 570, a processor 580, and a power supply 590. A person skilled in the art may understand that the structure of the mobile phone shown in FIG. 18 does not constitute any limitation on the mobile phone, and instead, the mobile phone may include components more or fewer than those shown in the figure, or combine some components, or have a different component arrangement.

The following makes a specific description of the components of the mobile phone with reference to FIG. 18.

The RF circuit 510 may be configured to receive and transmit a signal in an information receiving and transmission process or a call process, and in particular, after receiving downlink information of a base station, transmit the downlink information to the processor 580 for processing. In addition, the RF circuit transmits uplink data to the base station. Generally, the RF circuit 510 includes, but is not limited to, an antenna, at least one amplifier, a transceiver, a coupler, a low noise amplifier (LNA), and a duplexer. In addition, the RF circuit 510 may also communicate with a network and another device by means of wireless communication. The wireless communication may use any communication standard or protocol, which includes, but is not limited to, global system for mobile communications (GSM), general packet radio service (GPRS), code division multiple access (CDMA), wideband code division multiple access (WCDMA), long term evolution (LTE), e-mail, short messaging service (SMS), and the like.

The memory 520 may be configured to store a software program and a module. The processor 580 runs the software program and the module that are stored in the memory 520, to implement various functional applications and data processing of the mobile phone. The memory 520 may mainly include a program storage area and a data storage area. The program storage area may store an operating system, an application program required by at least one function (for example, a sound playback function and an image playback function), or the like. The data storage area may store data (for example, audio data and a phone book) created according to use of the mobile phone. In addition, the memory 520 may include a high-speed random access memory, and may also include a non-volatile memory such as at least one magnetic disk storage device, a flash memory, or another volatile solid-state storage device.

The input unit 530 may be configured to receive inputted digit or character information, and generate a keyboard signal input related to the user setting and function control of the mobile phone. Specifically, the input unit 530 may include a touch panel 531 and another input device 532. The touch panel 531 is also referred to as a touchscreen, may collect a touch operation that is performed by a user on or near the touch panel 531 (for example, an operation that is performed by a user by using any appropriate object or accessory such as a finger or a stylus on or near the touch panel 531), and drive a corresponding connection apparatus according to a preset program. In some embodiments, the touch panel 531 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into a contact coordinate, then transmits the contact coordinate to the processor 580, and receives and executes a command transmitted by the processor 580. In addition, the touch panel 531 may be a resistive, capacitive, infrared, or surface acoustic touch panel. Besides the touch panel 531, the input unit 530 may further include another input device 532. Specifically, the input device 532 may include, but is not limited to, one or more of a physical keyboard, a functional key (such as a volume control key or a switch key), a track ball, a mouse, and a joystick.

The display unit 540 may be configured to display information inputted by the user or information provided for the user, and various menus of the mobile phone. The display unit 540 may include a display panel 541. In some embodiments, the display panel 541 may be configured in the form of a liquid crystal display (LCD), an organic light-emitting diode (OLED), or the like. Further, the touch panel 531 may cover the display panel 541. After detecting a touch operation on or near the touch panel, the touch panel 531 transfers the operation to the processor 580 to determine a touch event type. Then the processor 580 provides corresponding visual output on the display panel 541 according to the touch event type. Although in FIG. 18, the touch panel 531 and the display panel 541 are used as two separate parts to implement input and output functions of the mobile phone, in some embodiments, the touch panel 531 and the display panel 541 may be integrated to implement the input and output functions of the mobile phone.

The mobile phone may further include at least one sensor 550 such as an optical sensor, a motion sensor, and other sensors. Specifically, the optical sensor may include an ambient light sensor and a proximity sensor, where the ambient light sensor may adjust luminance of the display panel 541 according to the luminance of the ambient light, and the proximity sensor may switch off the display panel 541 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 560, a speaker 561, and a microphone 562 may provide audio interfaces between the user and the mobile phone. The audio circuit 560 may convert received audio data into an electrical signal and transmit the electrical signal to the speaker 561. The speaker 561 converts the electrical signal into a sound signal and outputs the sound signal. In addition, the microphone 562 converts a collected sound signal into an electrical signal. After receiving the electrical signal, the audio circuit 560 converts the electrical signal into audio data, and then outputs the audio data. After being processed by the processor 580, the audio data is transmitted through the RF circuit 510 to, for example, another mobile phone or the audio data is outputted to the memory 520 for further processing.

Wi-Fi is a short distance wireless transmission technology. The mobile phone may help, by using the Wi-Fi module 570, a user to receive and transmit an e-mail, browse a web page, access streaming media, and the like, which provides wireless broadband Internet access for the user. Although FIG. 18 shows the Wi-Fi module 570, it may be understood that the Wi-Fi module is not a necessary component of the mobile phone, and when required, the Wi-Fi module may be omitted as long as the scope of the essence of the present disclosure is not changed.

The processor 580 is the control center of the mobile phone, and is connected to various parts of the mobile phone by using various interfaces and lines. By running or executing the software program and/or module stored in the memory 520, and invoking data stored in the memory 520, the processor performs various functions and data processing of the mobile phone, thereby performing overall monitoring on the mobile phone. In some embodiments, the processor 580 may include one or more processing units. In some embodiments, the processor 580 may integrate an application processor and a modem, where the application processor mainly processes an operating system, a user interface, an application program, and the like, and the modem mainly processes wireless communication. It may be understood that the foregoing modem may either not be integrated into the processor 580.

The mobile phone further includes the power supply 590 (such as a battery) for supplying power to the components. In some embodiments, the power supply may be logically connected to the processor 580 by using a power management system, thereby implementing functions such as charging, discharging and power consumption management by using the power management system.

Although not shown in the figure, the mobile phone may further include a camera, a Bluetooth module, and the like, which are not further described herein.

In this embodiment of this application, the processor 580 included in the terminal device further has the following functions:

obtaining a to-be-segmented image, the to-be-segmented image including a plurality of extreme points;

generating first image feature information according to the to-be-segmented image, the first image feature information including N image matrices and a first heatmap, the first heatmap being generated according to the plurality of extreme points, N is an integer greater than or equal to 1;

obtaining a first image segmentation region corresponding to the first image feature information by using a first image segmentation model, the first image segmentation model including a first heatmap channel and N first matrix channels, the N first matrix channels having a one-to-one correspondence with the N image matrices, the first heatmap channel corresponding to the first heatmap;

obtaining a second heatmap according to an annotation point corresponding to the first image segmentation region and the first image segmentation region;

obtaining a second image segmentation region corresponding to the to-be-segmented image by using a second image segmentation model, the second image segmentation model including a segmentation region channel, a second heatmap channel, and N second matrix channels, the N second matrix channels having a one-to-one correspondence with the N image matrices, the segmentation region channel corresponding to the first image segmentation region, the second heatmap channel corresponding to the second heatmap; and generating an image recognition result of the to-be-segmented image according to the second image segmentation region.

Figure 19:
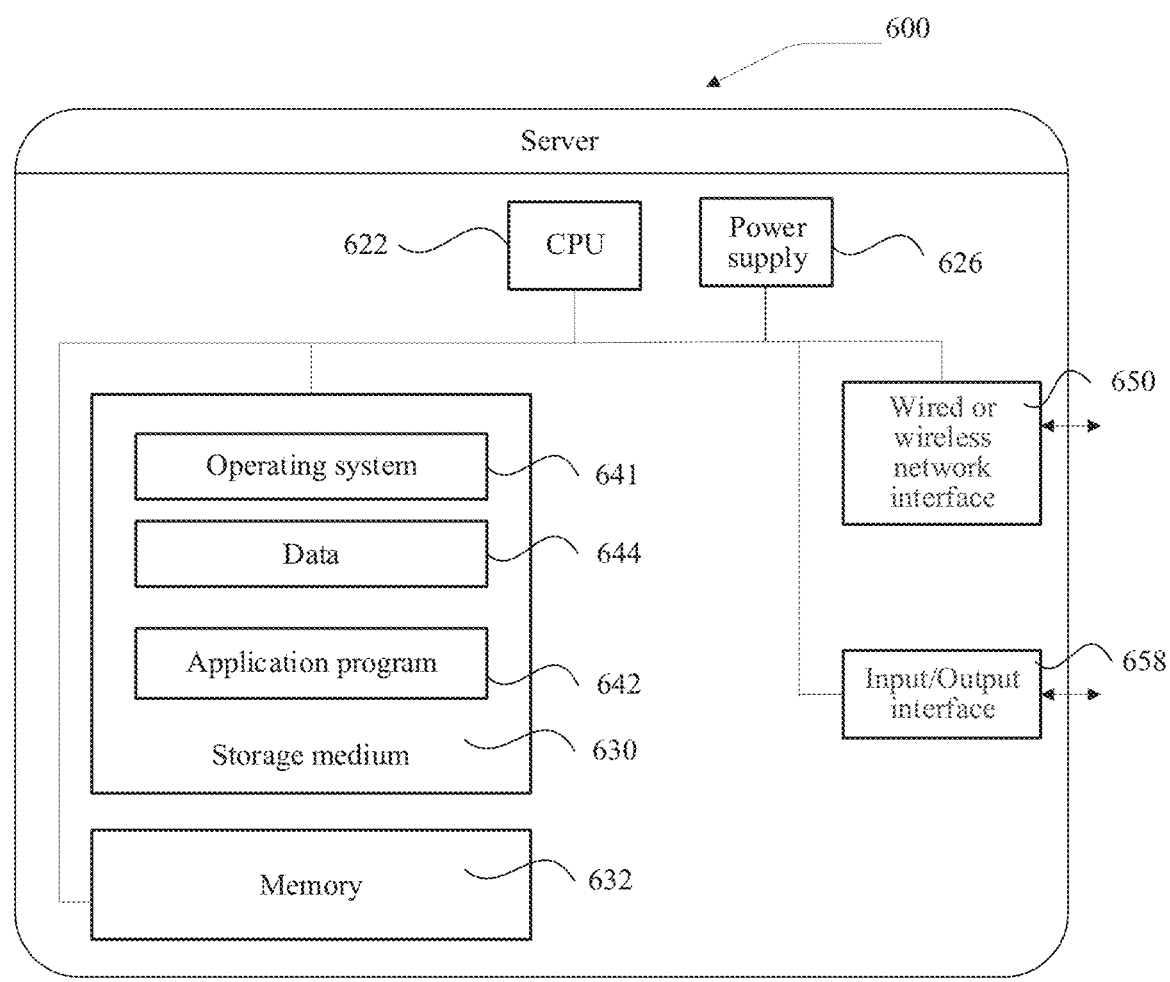
FIG. 19 is a schematic structural diagram of a server according to an embodiment of this application.

FIG. 19 is a schematic structural diagram of a server according to an embodiment of this application. The server 600 is a possible implementation of the image processing device. The server 600 may vary considerably depending on configuration or performance, and may include one or more central processing units (CPU) 622 (for example, one or more processors), a memory 632, and one or more non-transitory computer readable storage medium 630 (for example, one or more massive storage devices) storing an application program 642 or data 644. The memory 632 and the storage medium 630 may be transient storage or persistent storage. The program stored in the storage medium 630 may include one or more modules (not shown), and each module may include a series of instruction operations for the server. Further, the CPU 622 may be configured to communicate with the storage medium 630 to perform the series of instruction operations in the storage medium 630 on the server 600.

The server 600 may further include one or more power supplies 626, one or more wired or wireless network interfaces 650, one or more input/output interfaces 658, and/or one or more operating systems 641, for example, Windows Server™, Mac OS X™, Unix™, Linux™, and FreeBSD™.

The steps performed by the server in the foregoing embodiment may be based on the structure of the server shown in FIG. 19.

In this embodiment of this application, the CPU 622 included in the server further has the following functions:

obtaining a to-be-trained image set, the to-be-trained image set including at least one to-be-trained image;

obtaining a first predicted segmentation region of the to-be-trained image by using a first image segmentation model, the first image segmentation model being a pre-trained image segmentation model;

generating a to-be-trained heatmap according to a real segmentation region of the to-be-trained image and the first predicted segmentation region, the to-be-trained heatmap being generated by using at least one difference point;

obtaining a second predicted segmentation region according to the to-be-trained image, the first predicted segmentation region, the to-be-trained heatmap, and the real segmentation region by using a to-be-trained image segmentation model;

determining a model parameter corresponding to the to-be-trained image segmentation model according to the second predicted segmentation region and the real segmentation region by using a target loss function; and training the to-be-trained image segmentation model by using the model parameter to obtain a second image segmentation model.

A person skilled in the art may clearly understand that for convenience and conciseness of description, for specific working processes of the foregoing described system, apparatus and unit, refer to the corresponding processes in the foregoing method embodiments, and details are not described herein.

In addition, an embodiment of this application further provides a non-transitory computer readable storage medium, the computer readable storage medium is configured to store a computer program, the computer program is configured to perform the method according to the foregoing embodiments.

An embodiment of this application further provides a computer program product including instructions, the instructions, when run on a computer, causing the computer to perform the method according to the foregoing embodiments.

In the several embodiments provided in this application, it is to be understood that, the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the related art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing non-transitory computer readable storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art are to understand that they may still make modifications to the technical solutions described in the foregoing embodiments or make equivalent replacements to some technical features thereof, without departing from the spirit and scope of the technical solutions of the embodiments of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs image segmentation and/or training. In practical application, the foregoing functions may be allocated to and completed by different functional modules according to requirements, that is, an inner structure of a device is divided into different functional modules to implement all or a part of the functions described above.

What is claimed is:

1. An image region recognition method, performed by a computer device, the method comprising:

obtaining a to-be-segmented image that includes a plurality of extreme points corresponding to a target object in the to-be-segmented image;

generating first image feature information according to the to-be-segmented image, the first image feature information comprising N image matrices and a first heatmap that is generated according to the plurality of extreme points, wherein N is an integer greater than or equal to 1;

obtaining a first image segmentation region corresponding to the first image feature information using a first image segmentation model, the first image segmentation model including a first heatmap channel and N first matrix channels, the N first matrix channels having a one-to-one correspondence with the N image matrices and the first heatmap channel corresponds to the first heatmap;

obtaining a second heatmap according to a first annotation point corresponding to the first image segmentation region and the first image segmentation region;

obtaining a second image segmentation region corresponding to the to-be-segmented image using a second image segmentation model, the second image segmentation model including a segmentation region channel, a second heatmap channel, and N second matrix channels, the N second matrix channels having a one-to-one correspondence with the N image matrices, the segmentation region channel corresponding to the first image segmentation region, and the second heatmap channel corresponding to the second heatmap; and generating an image recognition result of the to-be-segmented image according to the second image segmentation region.

2. The method according to claim 1, wherein obtaining the to-be-segmented image comprises:

receiving an object annotation instruction for a to-be-processed image, the to-be-processed image comprising the target object, the object annotation instruction carrying location information of the plurality of extreme points corresponding to the target object, the plurality of extreme points being used for identifying a contour edge of the target object; and generating, in response to the object annotation instruction, the to-be-segmented image according to the to-be-processed image.

3. The method according to claim 2, wherein the location information of the plurality of extreme points includes a first extreme point location information, a second extreme point location information, a third extreme point location information, and a fourth extreme point location information, the first, second, third, and fourth extreme point locations respectively identifying peripheries of the contour edge of the target object.

4. The method according to claim 1, wherein obtaining the second heatmap further comprises:

receiving a first annotation instruction, corresponding to M annotation points, wherein the first annotation point is located inside the first image segmentation region and M is an integer greater than or equal to 1; and generating, in response to the first annotation instruction, the second heatmap according to the M annotation points.

5. The method according to claim 1, wherein obtaining the second heatmap further comprises:

receiving a second annotation instruction, corresponding to M annotation points, wherein the first annotation point is located outside the first image segmentation region and M is an integer greater than or equal to 1; and generating, in response to the second annotation instruction, the second heatmap according to the M annotation points.

6. The method according to claim 1, wherein the N first matrix channels comprise a red channel, a green channel, and a blue channel, and generating the first image feature information further comprises:

generating the first heatmap according to the plurality of extreme points in the to-be-segmented image;

generating N image matrices according to the to-be-segmented image, the N image matrices including a first image matrix corresponding to the red channel, a second image matrix corresponding to the green channel, and a third image matrix corresponding to the blue channel; and generating the first image feature information according to the first heatmap, the first image matrix, the second image matrix, and the third image matrix.

7. The method according to claim 1, wherein the N second matrix channels comprise a red channel, a green channel, and a blue channel, the method further comprising determining the N image matrices, the determining including:

generating the N image matrices according to the to-be-segmented image, the N image matrices comprising a first image matrix corresponding to the red channel, a second image matrix corresponding to the green channel, and a third image matrix corresponding to the blue channel; and after obtaining the second heatmap, generating second image feature information according to the first image segmentation region, the second heatmap, the first image matrix, the second image matrix, and the third image matrix, wherein the second image feature information is used as input information by the second image segmentation model for obtaining the second image segmentation region.

8. The method according to claim 7, wherein obtaining the second image segmentation region via the second image segmentation model comprises:

encoding the second image feature information using an encoder of the second image segmentation model to obtain a first feature map and a second feature map, the encoder including a middle flow module and an atrous depthwise separable convolution, wherein the atrous depthwise separable convolution is configured to extract a feature map of the second image feature information and the middle flow module is configured to perform T repetitions, wherein T is an integer greater than 8;

concatenating the first feature map and the second feature map to obtain a target feature map; and decoding the target feature map using a decoder of the second image segmentation model to obtain the second image segmentation region.

9. The method according to claim 8, wherein decoding the target feature map further comprises:

decoding the target feature map using the decoder of the second image segmentation model to obtain a first pixel set and a second pixel set, the first pixel set comprising a plurality of first pixels, the second pixel set comprising a plurality of second pixels; and generating the second image segmentation region according to the first pixel set and the second pixel set.

10. A computer device, comprising:
one or more processors; and
memory storing one or more programs, that, when executed by the one or more processors, cause the one or more processors to perform operations comprising:

obtaining a to-be-segmented image that includes a plurality of extreme points corresponding to a target object in the to-be-segmented image;

generating first image feature information according to the to-be-segmented image, the first image feature information comprising N image matrices and a first heatmap that is generated according to the plurality of extreme points, wherein N is an integer greater than or equal to 1;

obtaining a first image segmentation region corresponding to the first image feature information using a first image segmentation model, the first image segmentation model including a first heatmap channel and N first matrix channels, the N first matrix channels having a one-to-one correspondence with the N image matrices and the first heatmap channel corresponds to the first heatmap;

obtaining a second heatmap according to a first annotation point corresponding to the first image segmentation region and the first image segmentation region;

obtaining a second image segmentation region corresponding to the to-be-segmented image using a second image segmentation model, the second image segmentation model including a segmentation region channel, a second heatmap channel, and N second matrix channels, the N second matrix channels have a one-to-one correspondence with the N image matrices, the segmentation region channel corresponds to the first image segmentation region, and the second heatmap channel corresponds to the second heatmap; and generating an image recognition result of the to-be-segmented image according to the second image segmentation region.

11. The computer device according to claim 10, wherein obtaining the to-be-segmented image comprises:

receiving an object annotation instruction for a to-be-processed image, the to-be-processed image comprising the target object, the object annotation instruction carrying location information of the plurality of extreme points corresponding to the target object, the plurality of extreme points being used for identifying a contour edge of the target object; and generating, in response to the object annotation instruction, the to-be-segmented image according to the to-be-processed image.

12. The computer device according to claim 11, wherein the location information of the plurality of extreme points includes a first extreme point location information, a second extreme point location information, a third extreme point location information, and a fourth extreme point location information, the first, second, third, and fourth extreme point locations respectively identifying peripheries of the contour edge of the target object.

13. The computer device according to claim 10, wherein obtaining the second heatmap further comprises:

receiving a first annotation instruction, corresponding to M annotation points, wherein the first annotation point is located inside the first image segmentation region and M is an integer greater than or equal to 1; and generating, in response to the first annotation instruction, the second heatmap according to the M annotation points.

14. The computer device according to claim 10, wherein obtaining the second heatmap further comprises:
   receiving a second annotation instruction, corresponding to M annotation points, wherein the first annotation point is located outside the first image segmentation region and M is an integer greater than or equal to 1; and
   generating, in response to the second annotation instruction, the second heatmap according to the M annotation points.

15. The computer device according to claim 10, wherein the N first matrix channels comprise a red channel, a green channel, and a blue channel, and generating the first image feature information further comprises:
   generating the first heatmap according to the plurality of extreme points in the to-be-segmented image;
   generating N image matrices according to the to-be-segmented image, the N image matrices including a first image matrix corresponding to the red channel, a second image matrix corresponding to the green channel, and a third image matrix corresponding to the blue channel; and
   generating the first image feature information according to the first heatmap, the first image matrix, the second image matrix, and the third image matrix.

16. The computer device according to claim 10, wherein the N second matrix channels comprise a red channel, a green channel, and a blue channel, the method further comprising determining the N image matrices, the determining including:
   generating the N image matrices according to the to-be-segmented image, the N image matrices comprising a first image matrix corresponding to the red channel, a second image matrix corresponding to the green channel, and a third image matrix corresponding to the blue channel; and
   after obtaining the second heatmap, generating second image feature information according to the first image segmentation region, the second heatmap, the first image matrix, the second image matrix, and the third image matrix, wherein the second image feature information is used as input information by the second image segmentation model for obtaining the second image segmentation region.

17. A non-transitory computer readable storage medium storing instructions that, when executed by one or more processors of a computer device, cause the one or more processors to perform operations comprising:
   obtaining a to-be-segmented image that includes a plurality of extreme points corresponding to a target object in the to-be-segmented image;
   generating first image feature information according to the to-be-segmented image, the first image feature information comprising N image matrices and a first heatmap that is generated according to the plurality of extreme points, wherein N is an integer greater than or equal to 1;
   obtaining a first image segmentation region corresponding to the first image feature information using a first image segmentation model, the first image segmentation model including a first heatmap channel and N first matrix channels, the N first matrix channels having a one-to-one correspondence with the N image matrices and the first heatmap channel corresponds to the first heatmap;
   obtaining a second heatmap according to a first annotation point corresponding to the first image segmentation region and the first image segmentation region;
   obtaining a second image segmentation region corresponding to the to-be-segmented image using a second image segmentation model, the second image segmentation model including a segmentation region channel, a second heatmap channel, and N second matrix channels, the N second matrix channels have a one-to-one correspondence with the N image matrices, the segmentation region channel corresponds to the first image segmentation region, and the second heatmap channel corresponds to the second heatmap; and
   generating an image recognition result of the to-be-segmented image according to the second image segmentation region.

18. The non-transitory computer readable storage medium according to claim 17, wherein obtaining the to-be-segmented image comprises:
   receiving an object annotation instruction for a to-be-processed image, the to-be-processed image comprising the target object, the object annotation instruction carrying location information of the plurality of extreme points corresponding to the target object, the plurality of extreme points being used for identifying a contour edge of the target object; and
   generating, in response to the object annotation instruction, the to-be-segmented image according to the to-be-processed image.

19. The non-transitory computer readable storage medium according to claim 18, wherein the location information of the plurality of extreme points includes a first extreme point location information, a second extreme point location information, a third extreme point location information, and a fourth extreme point location information, the first, second, third, and fourth extreme point locations respectively identifying peripheries of the contour edge of the target object.

20. The non-transitory computer readable storage medium according to claim 17, wherein obtaining the second heatmap further comprises:
   receiving a first annotation instruction, corresponding to M annotation points, wherein the first annotation point is located inside the first image segmentation region and M is an integer greater than or equal to 1; and
   generating, in response to the first annotation instruction, the second heatmap according to the M annotation points.

* * * * *